United States Patent
Agazzi et al.

(10) Patent No.: US 6,898,238 B2
(45) Date of Patent: *May 24, 2005

(54) APPARATUS FOR, AND METHOD OF, REDUCING POWER DISSIPATION IN A COMMUNICATIONS SYSTEM

(75) Inventors: Oscar E. Agazzi, Irvine, CA (US); John L. Creigh, Rancho Santa Margarita, CA (US); Mehdi Hatamian, Mission Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 543 days.

This patent is subject to a terminal disclaimer.

(21) Appl. No.: 09/930,584

(22) Filed: Aug. 15, 2001

(65) Prior Publication Data

US 2001/0055335 A1 Dec. 27, 2001

Related U.S. Application Data

(63) Continuation of application No. 09/143,476, filed on Aug. 28, 1998, now Pat. No. 6,304,598.

(51) Int. Cl.[7] .................................................. H03H 7/30
(52) U.S. Cl. ...................... 375/232; 375/350; 708/322; 708/323
(58) Field of Search ............................... 375/231, 232, 375/346, 368, 350; 708/322, 323

(56) References Cited

U.S. PATENT DOCUMENTS

| | | | |
|---|---|---|---|
| 4,805,215 A | * | 2/1989 | Miller .................... 379/406.08 |
| 5,307,405 A | | 4/1994 | Sih ............................ 379/410 |
| 5,388,092 A | | 2/1995 | Koyama et al. ........... 370/32.1 |
| 5,455,819 A | | 10/1995 | Sugiyama .................... 370/13 |
| 5,517,435 A | | 5/1996 | Sugiyama .............. 364/724.19 |
| 5,526,347 A | | 6/1996 | Chen et al. ................. 370/32.1 |
| 5,539,773 A | | 7/1996 | Knee et al. .................. 375/232 |
| 5,604,741 A | | 2/1997 | Samueli et al. ............. 370/402 |
| 5,617,450 A | | 4/1997 | Kakuishi et al. ............ 375/230 |
| 5,636,151 A | * | 6/1997 | Ikeda ......................... 708/322 |
| 5,659,609 A | | 8/1997 | Koizumi et al. ............ 379/410 |
| 5,745,564 A | | 4/1998 | Meek .......................... 379/410 |
| 5,796,725 A | | 8/1998 | Muraoka .................... 370/290 |
| 5,933,495 A | | 8/1999 | Oh ............................. 379/420 |
| 5,946,349 A | | 8/1999 | Raghunath ................. 375/232 |
| 6,466,616 B1 | * | 10/2002 | Stenstrom et al. .......... 375/233 |

* cited by examiner

Primary Examiner—Dac V. Ha
(74) Attorney, Agent, or Firm—McAndrews, Held & Malloy, Ltd.

(57) ABSTRACT

A method is provided for reducing power dissipation within a communications system having a plurality of adaptive filters with a plurality of taps, each tap is switchable between an active and an inactive state, each tap also has a coefficient. An acceptable error for the system is specified. This error is typically the mean squared error of the system. A tap threshold is set for each active tap. Those taps having a coefficient with an absolute value less than the tap threshold set for the active tap are deactivated. The error of the system is computed and compared to the acceptable system error. If the computed system error is less than the acceptable system error, the tap threshold for each active tap is increased. The process of comparing the tap coefficients to the tap thresholds, deactivating taps with a coefficient less than the tap threshold and computing the resulting system error is repeated until the computed system error approaches the acceptable system error without exceeding the acceptable system error. In addition, the previously deactivated taps may be periodically activated and their coefficients once again compared to the tap threshold. If a coefficient is less than the tap threshold the tap is again deactivated. If a coefficient is greater than the tap threshold, the tap remains active.

2 Claims, 17 Drawing Sheets

APPARATUS FOR, AND METHOD OF, REDUCING POWER DISSIPATION IN A COMMUNICATIONS SYSTEM

CROSS-REFERENCE TO RELATED APPLICATION

This patent application is a continuation of U.S. patent application Ser. No. 09/143,476, filed Aug. 28, 1998 now U.S. Pat. No. 6,304,598.

BACKGROUND OF THE INVENTION

1. Field of the Invention

This invention relates to systems for, and methods of, providing for the transmission and reception of signals through unshielded twisted pairs of wires within a communications system. The invention particularly relates to systems for, and methods of, reducing the power dissipation in devices within a communications system hand to systems for, and methods of, reducing such power dissipation in communications systems having high throughputs. A "high throughput" as used within the context of this disclosure may include, but is not limited to, one gigabit (GB) per second.

2. Description of Related Art

A basic communications system is illustrated in FIG. 1. The system includes a hub and a plurality of computers serviced by the hub in a local area network (LAN). Four computers are shown by way of illustration but a different number of computers may be contained within the system. Each of the computers is usually displaced from the hub by a distance which may be as great as approximately one hundred meters (100 m.). The computers are also displaced from each other. The hub is connected to each of the computers by a communications line. Each communication line includes unshielded twisted pairs of wires or cables. Generally, the wires or cables are formed from copper. Four unshielded twisted pairs of wires are provided in each communication line between each computer and the hub. The system shown in FIG. 1 is operative with several categories of unshielded twisted pairs of cables designated as categories 3, 4 and 5 in the telecommunications industry. Category 3 cables are the poorest quality (and lowest cost) and category 6 and 7 cables are the best quality (and highest cost).

Associated with each communications system is a "throughput". The throughput of a system is the rate at which the system processes data and is usually expressed in bits/second. Most communications systems have throughputs of 10 megabits (Mb)/second or 100 Mb/second. A rapidly evolving area of communications system technology enables 1 Gb/second full-duplex communication over existing category-5 unshielded twisted pair cables. Such a system is commonly referred to as "Gigabit Ethernet."

A portion of a typical Gigabit Ethernet is shown in FIG. 2. The Gigabit Ethernet provides for transmission of digital signals between one of the computers and the hub and the reception of such signals at the other of the computer and the hub. A similar system can be provided for each of the computers. The system includes a gigabit medium independent interface (GMII) block which receives data in byte-wide format at a specified rate, for example 125 MHz, and passes the data onto the physical coding sublayer (PCS) which performs scrambling, coding, and a variety of control functions. The PCS encodes bits from the GMII into 5-level pulse amplitude modulation (PAM) signals. The five symbol levels are −2, −1, 0, +1, and +2. Communication between the computer and hub is achieved using four unshielded twisted pairs of wires or cables, each operating at 250 Mb/second, and eight transceivers, one positioned at each end of a unshielded twisted pair. The full-duplex bidirectional operation provides for the use of hybrid circuits at the two ends of each unshielded twisted pair. The hybrid controls access to the communication line, thereby allowing for full-duplex bidirectional operation between the transceivers at each end of the communications line.

A common problem associated with communications systems employing multiple unshielded twisted pairs and multiple transceivers is the introduction of crosstalk and echo noise or impairment signals into the transmission signals. Noise is inherent in all such communications systems regardless of the system throughput. However, the effects of these impairment signals are magnified in Gigabit Ethernet. Impairment signals include echo, near-end crosstalk (NEXT), and far-end crosstalk (FEXT) signals. As a result of these impairment signals the performance of the transceivers, particularly the receiver portion, is degraded.

NEXT is an impairment signal that results from capacitive and inductive coupling of the signals from the near-end transmitters to the input of the receivers. The NEXT impairment signals encountered by the receiver in transceiver A are shown in FIG. 3. The crosstalk signals from transmitters B, C, and D appear as noise to receiver A, which is attempting to detect the direct signal from transmitter E. Each of the receivers in the system encounters the same effect and accordingly the signals passing through the receivers experience signal degradation due to NEXT impairment signals. For clarity of FIG. 3, only the NEXT impairment experienced by receiver A is illustrated.

Similarly, because of the bidirectional nature of the communications systems, an echo impairment signal is produced by each transmitter on the receiver contained within the same transceiver as the transmitter. The echo impairment signal encountered by the receiver in each transceiver is shown in FIG. 4. The crosstalk signals from transmitters appear as noise to the receivers, which are attempting to detect the signal from the transmitter at the opposite end of the communications line. Each of the receivers in the system encounters the same effect and accordingly the signals passing through the receivers experience signal distortion due to the echo impairment signal.

Far-end crosstalk (FEXT) is an impairment that results from capacitive coupling of the signal from the far-end transmitters to the input of the receivers. The FEXT impairment signals encountered by the receiver in transceiver A are shown in FIG. 5. The crosstalk signals from transmitters F, G, and H appears as noise to receiver A, which is attempting to detect the direct signal from transmitter E. Each of the receivers in the system encounters the same effect and accordingly the signals passing through the receivers experience signal distortion due to the FEXT impairment signal. For clarity of FIG. 5 only the FEXT impairment experienced by receiver A is illustrated.

Four transceivers at one end of a communications line are illustrated in detail in FIG. 6. The components of the transceivers are shown as overlapping blocks, with each layer corresponding to one of the transceivers. The GMII, PCS, and hybrid of FIG. 6 correspond to the GMII, PCS, and hybrid of FIG. 2 and are considered to be separate from the transceiver. The combination of the transceiver and hybrid forms one "channel" of the communications system. Accordingly, FIG. 6 illustrates four channels, each of which operates in a similar manner. The transmitter portion of each transceiver includes a pulse-shaping filter and a digital-to-analog (D/A) converter. The receiver portion of each transceiver includes an analog-to-digital (A/D) converter, a first-in first-out (FIFO) buffer, a digital adaptive equalizer system including a feed-forward equalizer (FFE) and a detector. The receiver portion also includes a timing recovery system and a near-end noise reduction system including a NEXT cancellation system and an echo canceller. The NEXT cancellation system and the echo canceller typically include numerous adaptive filters.

Characteristics of the communication line, e. g., length, may impact the ability of the NEXT cancellation system and echo cancellers to effectively cancel NEXT and echo noise. Measurements of typical cable responses, as well as simulation, show that in order to provide an adequate level of cancellation of these sources of interference, "long" echo and NEXT cancellers are required. The term "long" is used to describe a canceller having a large number of taps as necessitated by the characteristics of the cable. For example FIG. 7 shows the echo impulse response for a 100 m cable with a characteristic impedance of 85 ohm and 100 ohm terminations. Although the nominal characteristic impedance is 100 ohm, manufacturing standards allow for a 15% tolerance. The mismatch in impedance may result in a reflection at the far-end of the cable, which causes a secondary pulse with a delay of about one microsecond. Because of the long delay, cancelling this pulse requires an echo canceller with about 140 taps (125 taps to cover the one microsecond delay, plus approximately 15 additional taps to cancel the secondary pulse).

Often the echo impulse response has additional reflections at intermediate values of delay. In addition, structural return loss of the cable may cause continuous variations of the characteristic impedance along the cable, which results in a large number of smaller reflections at intermediate points. These intermediate reflections mean that the echo canceller should not be configured to cancel only the initial impulse and the end reflection but instead should be configured to cover the full span of the impulse response. Varying cable characteristics result in a wide variability of cable impulse responses. In addition, the response of a particular cable may change as a result of its operating environment. For example, a change in operating temperature may change the impulse response of the cable. Accordingly, it is difficult to precompute the locations at which taps are required and to build these locations into the design of the echo and NEXT cancellers. FIG. 8 shows the NEXT impulse response for a 100 m cable. As indicated, the NEXT response can also be long, requiring a large number of taps in the NEXT cancellers which make up the NEXT cancellation system. The combination of the NEXT and echo cancellers consumes the majority of the DSP operations in a Gigabit Ethernet.

The large number of taps required to achieve a satisfactory performance in these systems results in high power dissipation. This high power dissipation is undesirable in that it may make high throughput communication systems, particularly Gigabit Ethernet, inoperable and unmarketable. Thus there exists a need in the art to provide a method of, and an apparatus for, reducing the power dissipation of communication systems employing a large number of taps and to provide a method of, and apparatus for, reducing such power dissipation in a high throughput system such a Gigabit Ethernet. The present invention fulfills these needs.

SUMMARY OF THE INVENTION

Briefly, and in general terms, the invention relates to systems for, and methods of, reducing the power dissipation in devices within a communications system and to systems for, and methods of, reducing such power dissipation in communications systems having high throughputs.

In one embodiment, the invention involves a method of reducing power dissipation in a communications system having a plurality of adaptive filters each having a plurality of taps. The method includes the steps of specifying a threshold error for the system and periodically adjusting the transfer function of at least one of the adaptive filters by selectively deactivating taps while ensuring that the error of the communications system does not exceed the threshold error.

In an additional facet of this embodiment of the invention the step of periodically adjusting the transfer function of at least one of the adaptive filters includes the step of determining whether to deactivate a tap. In another facet the step of determining whether to deactivate a tap includes the steps of computing the tap error produced by deactivating such tap and if the tap error is less than a prespecified acceptable level of tap error, deactivating the tap. In yet another aspect of the invention the step of determining whether to deactivate a tap includes the steps of computing the filter error produced by deactivating such tap and if the filter error is less than a prespecified acceptable level of filter error, deactivating the tap. In an still another facet, the step of determining whether to deactivate a tap comprises the steps of computing the system error produced by deactivating such tap and if the system error is less than the threshold error, deactivating the tap. In an additional aspect, the step of periodically adjusting the transfer function of at least one of the adaptive filters further includes the step of determining whether to activate a previously deactivated tap. In yet another facet, the step of determining whether to activate a previously deactivated tap includes the steps of periodically activating previously deactivated taps; computing the tap error produced by deactivating such taps; and if the tap error is less than a prespecified acceptable level of tap error, deactivating the tap.

In another embodiment, the invention involves a method for reducing power dissipation within a communications system having a plurality of adaptive filters with a plurality of taps, each tap switchable between an active and an inactive state, each having a coefficient. The method includes the steps of a) specifying an acceptable error for the system; b) for each active tap, setting a tap threshold; c) for each active tap, deactivating those taps having a coefficient with an absolute value less than the tap threshold set for the active tap; d) computing a system error; e) comparing the computed system error to the acceptable system error; f) if the computed system error is less than the acceptable system error, increasing the tap threshold for each active tap; and g) repeating steps c) through f) until the computed system error approaches the acceptable system error without exceeding the acceptable system error.

In another embodiment, the invention involves a method for reducing power dissipation within a communications system having at least one adaptive filter with a plurality of taps, each tap switchable between an active and an inactive state, each tap having a coefficient. The method includes the steps of a) computing an initial system error; b) for each active tap, setting a tap error threshold; c) for each active tap, deactivating those taps having a coefficient with an absolute value less than the tap error threshold set for the active tap; d) computing a subsequent system error; e) if the difference between the subsequent system error and the initial system error is less than a prespecified value, increasing the tap error threshold for each active tap; and f) repeating steps c) through e) until the difference between the subsequent system error and the initial system error exceeds the prespecified value.

In another embodiment, the invention is a communications system which includes a communications line and a plurality of adaptive filters responsive to signals carried by the communications line. Each adaptive filter has a plurality of taps each having a coefficient, each tap switchable between an active and an inactive state. The system also includes means for specifying a threshold error for the system, means for setting the state of each tap, means for calculating a present error for the system, and means for comparing the present error to the threshold error.

In an additional facet of this embodiment of the invention the means for setting the state of each tap includes means for specifying a tap threshold for each tap, means for comparing for each tap the absolute value of the tap coefficient with the tap threshold, and means for deactivating those taps having a coefficient with an absolute value less than the tap threshold. In yet another aspect, the means for setting the state of each tap further includes means for periodically activating previously deactivated taps.

In another embodiment, the invention involves a power dissipation reduction system for use in a communication system having at least one adaptive filter having a plurality of taps each having a coefficient, each tap switchable between an active and an inactive state. The power dissipation reduction system includes means for specifying a threshold error for the system; means for setting the state of each tap; means for calculating a present error for the system; and means for comparing the present error to the threshold error.

These and other aspects and advantages of the present invention will become apparent from the following more detailed description, when taken in conjunction with the accompanying drawings which illustrate, by way of example, the preferred embodiments of the invention.

DETAILED DESCRIPTION OF THE PREFERRED EMBODIMENTS

The discussion in this specification may be considered to relate specifically to a Gigabit Ethernet for the purposes of explanation and understanding of the invention. However, it will be understood that the concepts of this invention and the scope of the claims apply to other types of communications systems than a Gigabit Ethernet.

Figure 1:
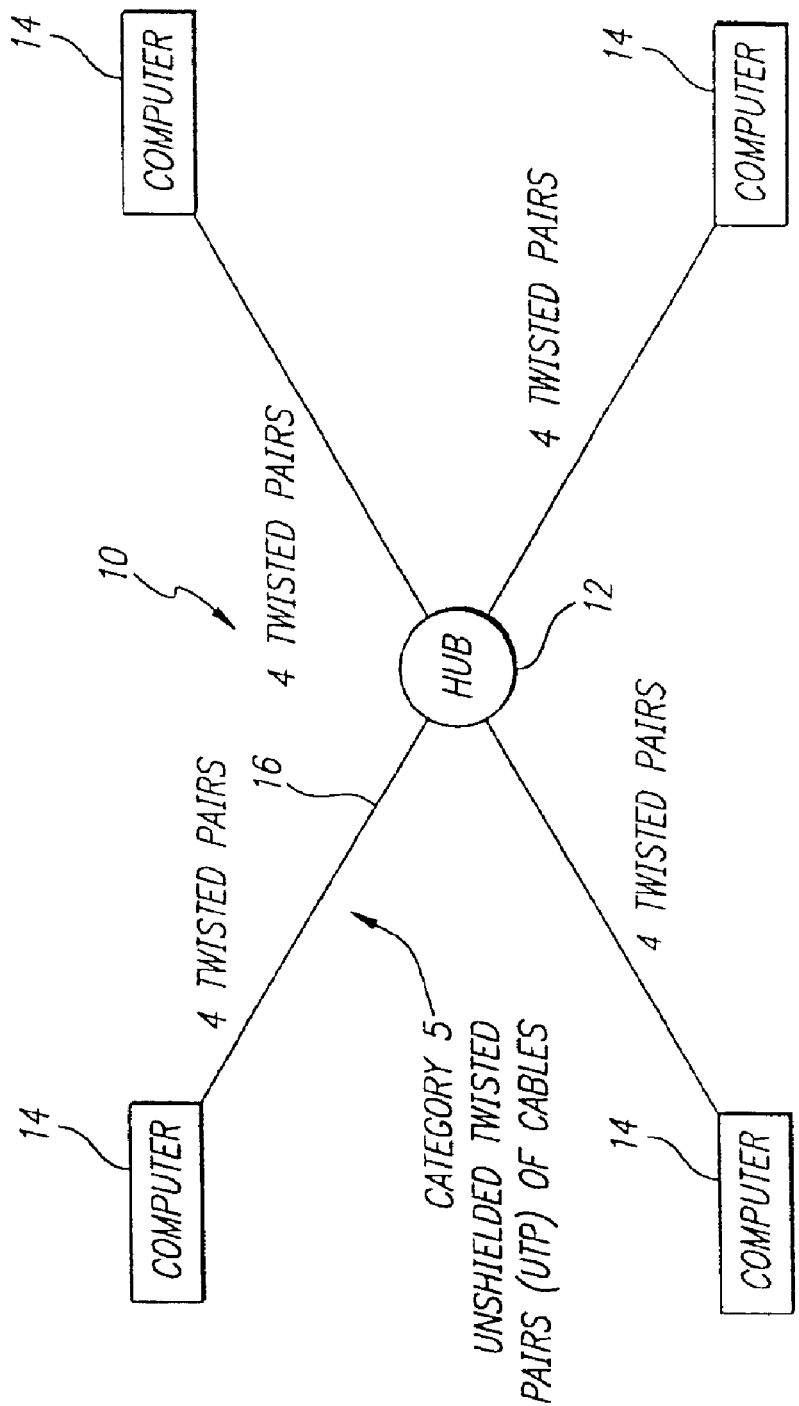
FIG. 1 is a schematic block diagram of a communications system providing a plurality of computers connected to a hub by communications lines to form a local area network (LAN)

A communications system incorporating the features of this invention is generally indicated at 10 in FIG. 1. The system 10 includes a hub 12 and a plurality of computers serviced by the hub in a local area network (LAN). Four computers 14 are shown by way of illustration but a different number of computers may be used without departing from the scope of the invention. Each of the computers 14 may be displaced from the hub 12 by a distance as great as approximately one hundred meters (100 m.). The computers 14 are also displaced from each other.

The hub 12 is connected to each of the computers 14 by a communications line 16. The communication line 16 comprises a plurality of unshielded twisted pairs of wires or cables. Generally, the wires or cables are formed from copper. Four unshielded twisted pairs of wires are provided in the system 10 between each computer and the hub 12. The system shown in FIG. 1 is operative with several categories of twisted pairs of cables designated as categories 3, 4 and 5 in the telecommunications industry. Category 3 cables are the poorest quality (and lowest cost) and category 5 cables are the best quality (and highest cost). Gigabit Ethernet uses category 5 cables.

Figure 2:
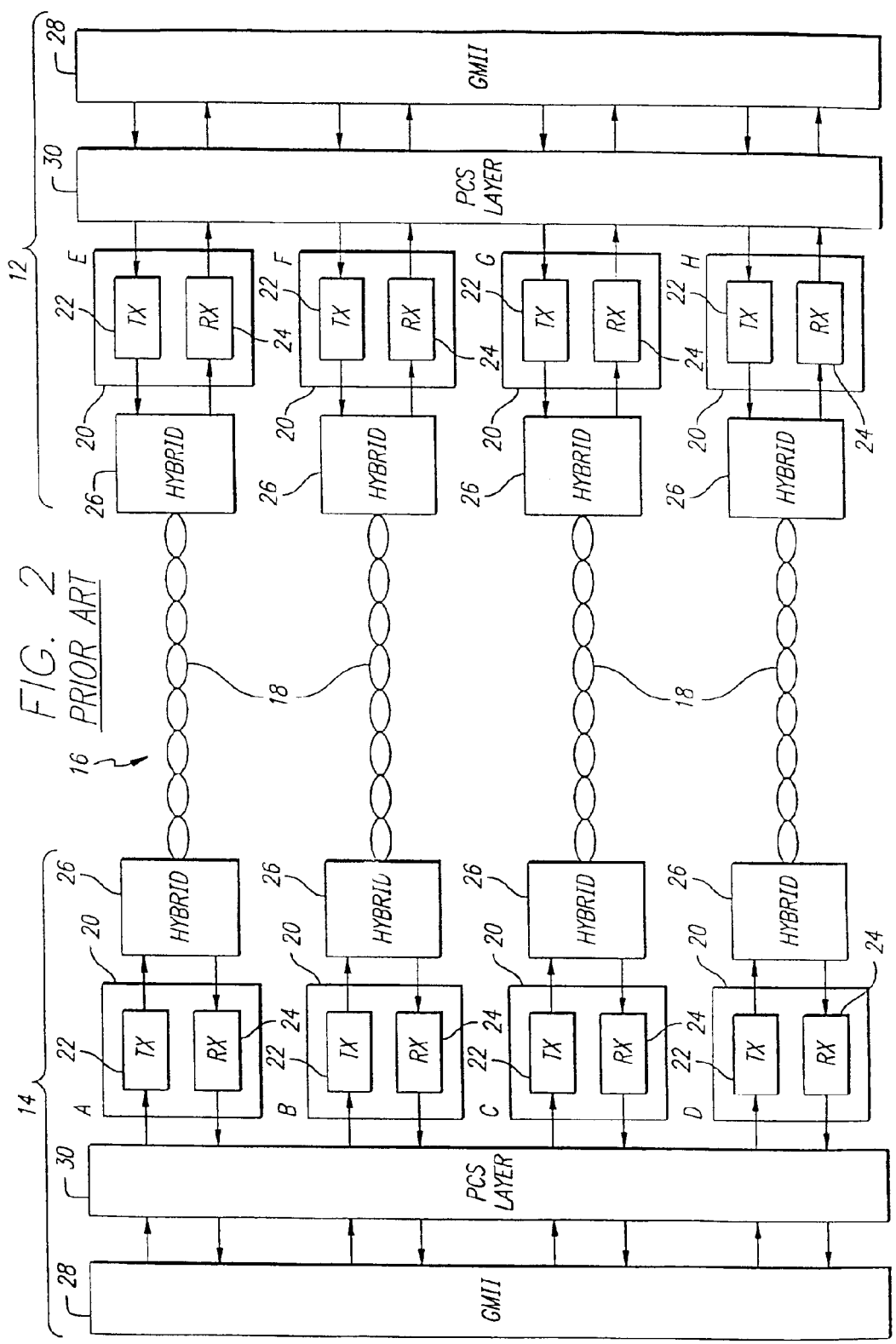
FIG. 2 is a schematic block diagram of a communications system providing a gigabit medium independent interface (GMII), a physical coding sublayer (PCS) and a plurality of unshielded twisted pairs of wires, each with a transceiver at each end.
Figure 3:
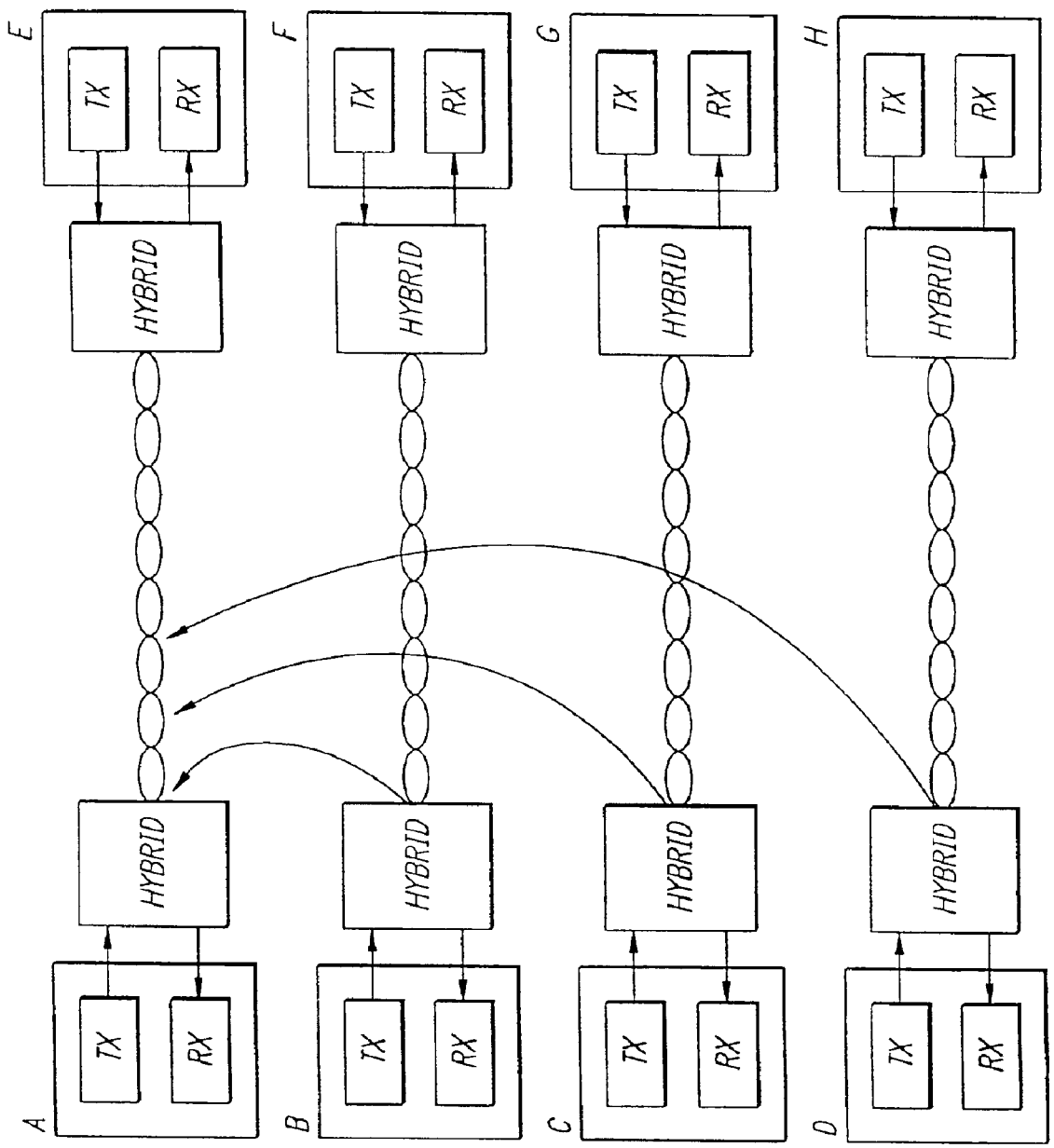
FIG. 3 is a schematic block diagram of a portion of the communications system of FIG. 2 depicting the NEXT impairment signals received by receiver A from adjacent transmitters B, C, and D.
Figure 4:
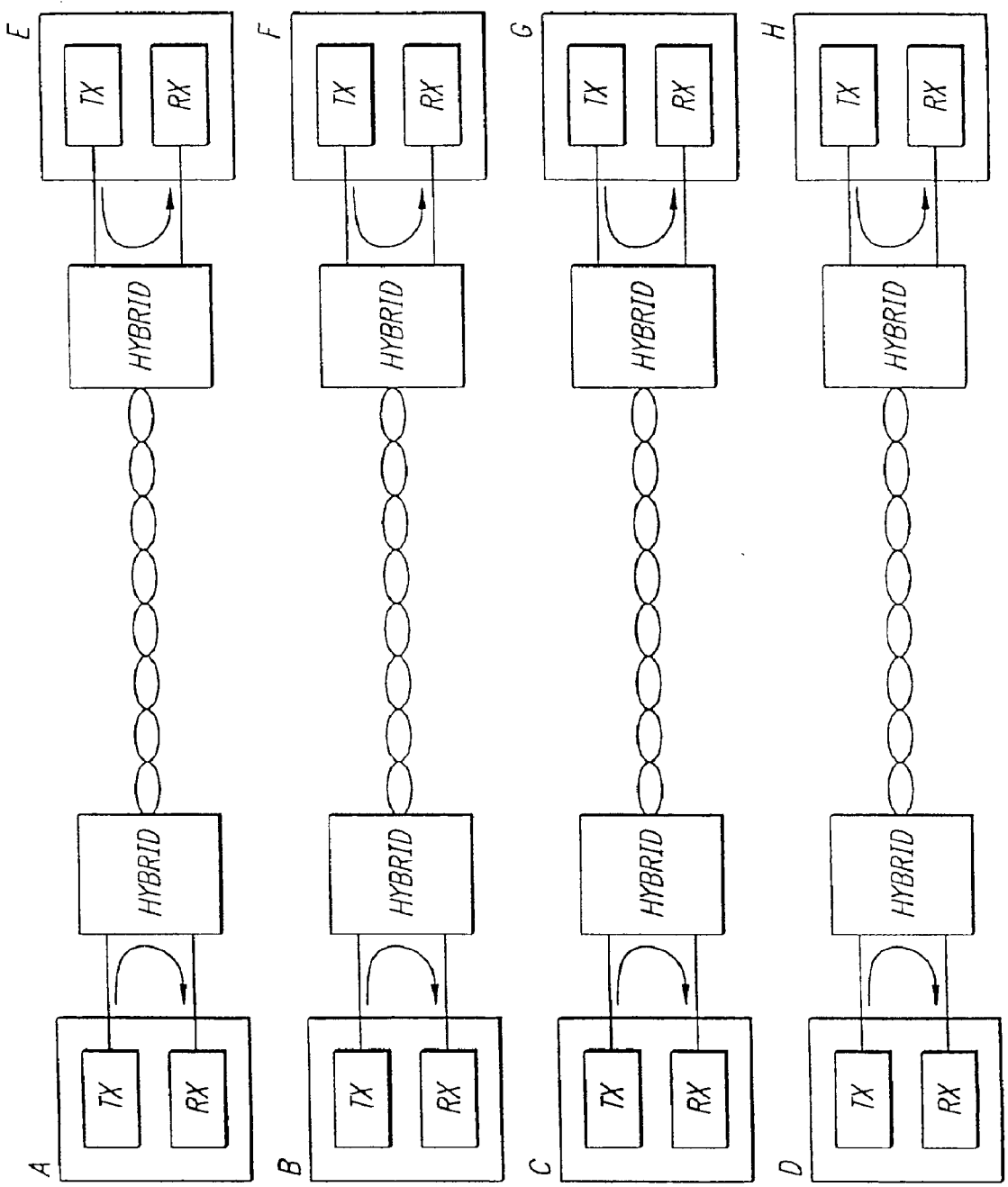
FIG. 4 is a schematic block diagram of a portion of the communications system of FIG. 2 depicting the echo impairment signal received by receiver A from transmitter A.
Figure 5:
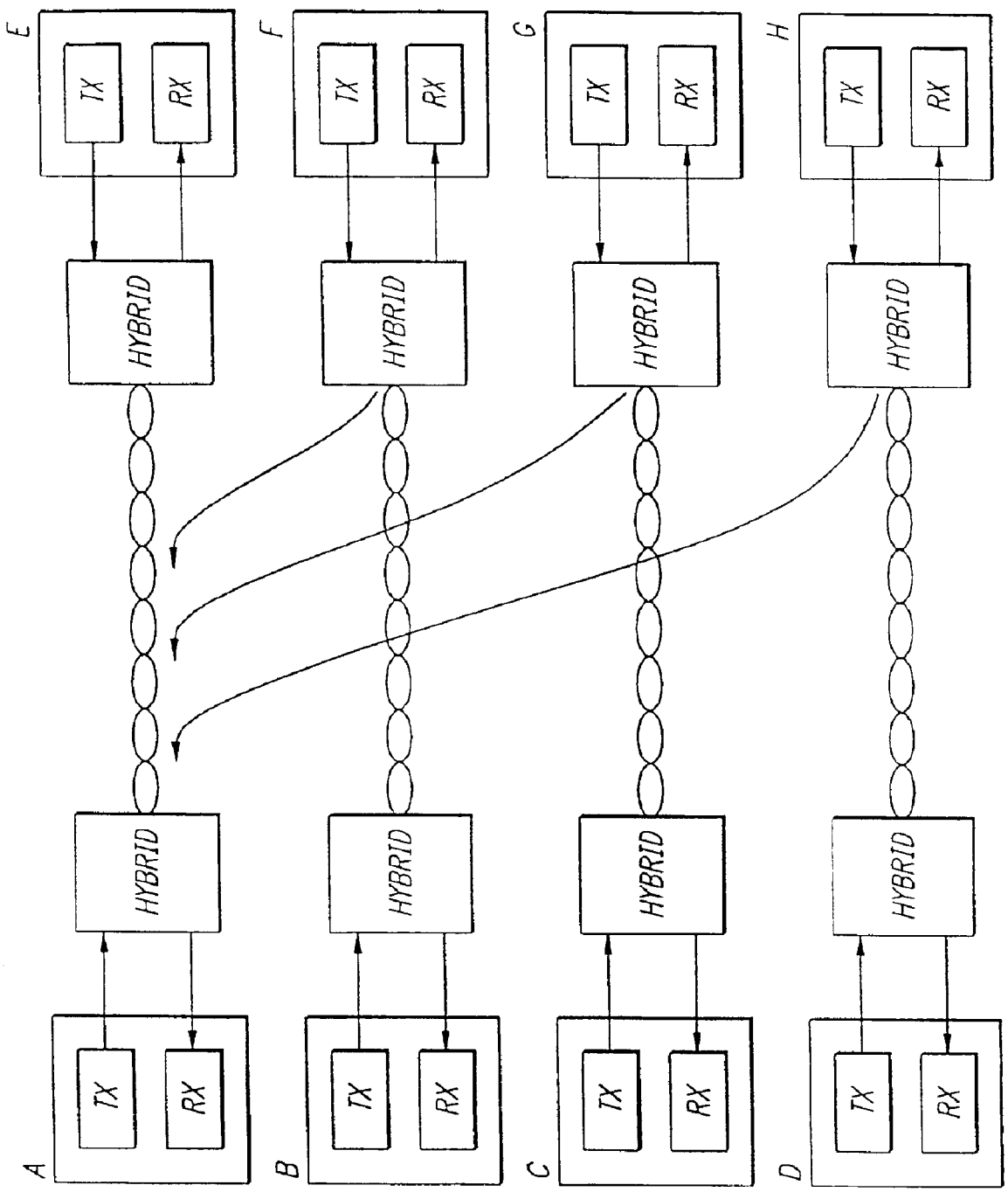
FIG. 5 is a schematic block diagram of a portion of the communications system of FIG. 2 depicting the FEXT impairment signals received by receiver A from opposite transmitters F, G, and H.
Figure 6:
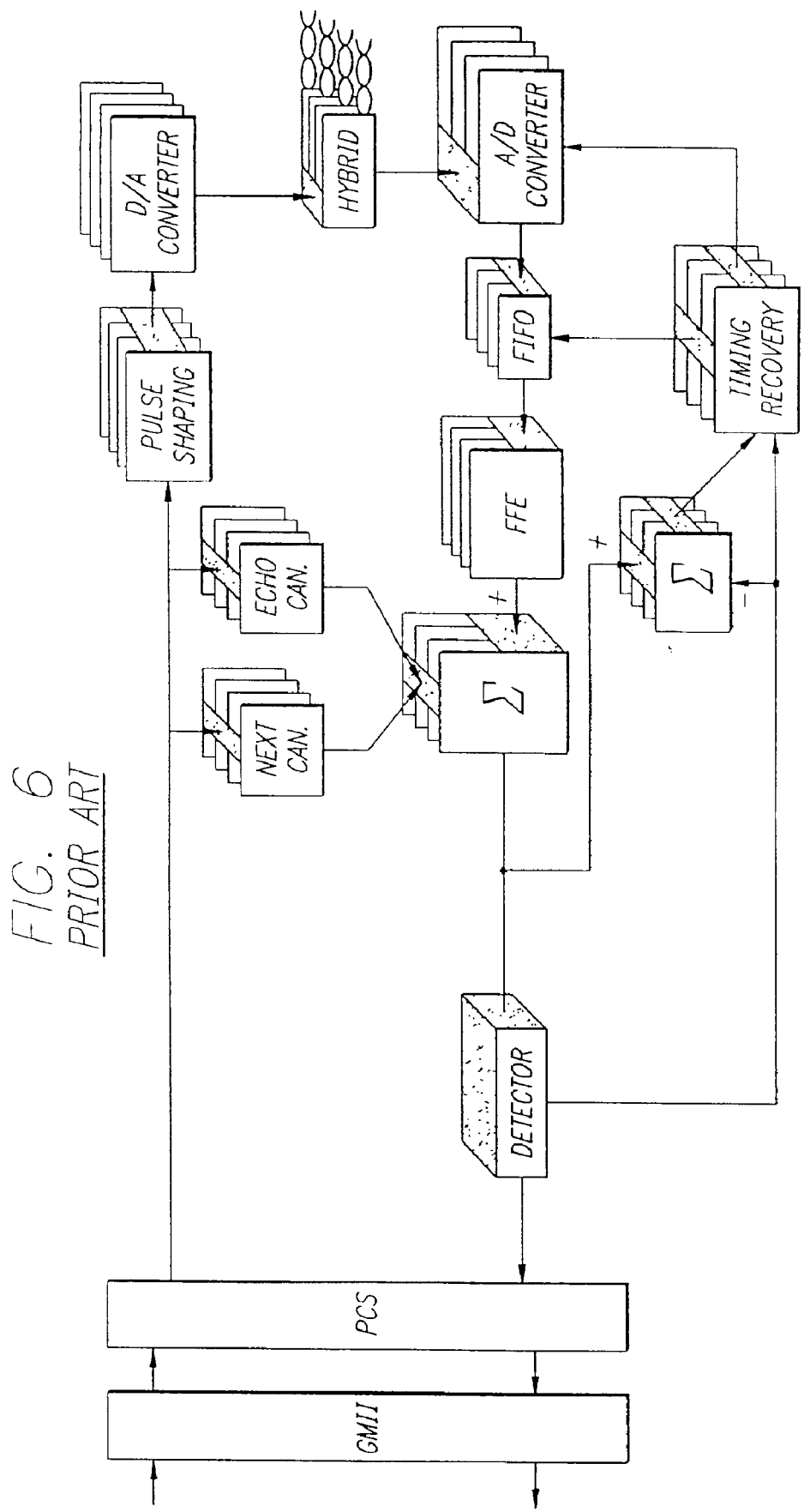
FIG. 6 is a schematic block diagram of a communications system including a plurality of transceivers, each having a NEXT cancellation system, an echo canceller, a feed forward equalizer, digital adaptive filter system including one detector, and a timing recovery circuit.

FIG. 2 illustrates, in detail, a portion of the communications system of FIG. 1 including one communications line 16 and portions of one of the computers 14 and the hub 12. The communications line 16 includes four unshielded twisted pairs of wires 18 operating at 250 Mb/second per pair. A transceiver 20, including a transmitter (TX) 22 and receiver (RX) 24, is positioned at each unshielded end of each twisted pair 18. Between each transceiver 20 and its associated unshielded twisted pair 18 is a hybrid 26. The hybrid 26 is the interface to the communication line 16 which allows for full-duplex bidirectional operation between the transceivers 20 at each end of the communications line. The hybrid also functions to isolate the transmitter and receiver associated with the transceiver, from each other.

The communications system includes a standard connector designated as a gigabit media independent interface (GMII). The GMII may be an eight bit wide data path in both the transmit and receive directions. Clocked at a suitable frequency, such as 125 MHz, the GMII results in a net throughput in both directions of data at a suitable rate such as 250 Mb/second per pair. The GMII provides a symmetrical interface in both the transmit and receive directions. A physical coding sublayer (PCS) 30 receives and transmits data between the GMII 28 and the transceivers 20. The PCS 30 performs such functions as scrambling and encoding/decoding data before forwarding the data to either the transceiver or the GMII. The PCS encodes bits from the GMII into 5-level pulse amplitude modulation (PAM) signals. The five symbol levels are −2, −1, 0, +1, and +2. The PCS also controls several functions of the transceivers, such as skew control as explained below.

Figure 9:
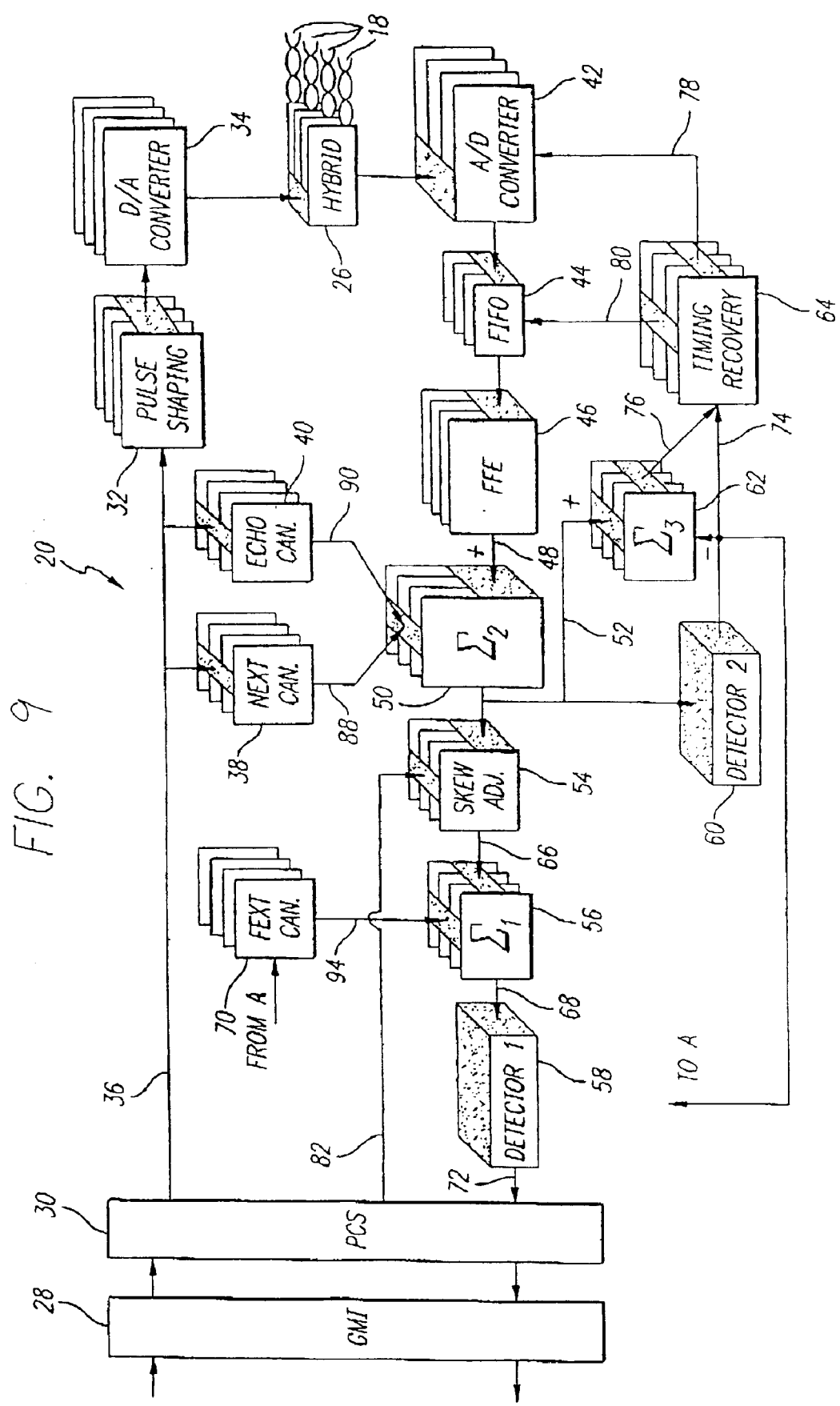
FIG. 9 is a schematic block diagram of a communications system including a plurality of transceivers each having a NEXT cancellation system, an echo canceller, and a FEXT cancellation system, digital adaptive filter system including a plurality of detectors and a skew adjuster, and a timing recovery circuit.

Four of the transceivers 20 are illustrated in detail in FIG. 9. The components of the transceivers 20 are shown as overlapping blocks, with each layer corresponding to one of the transceivers. The GMII 28, PCS 30, and hybrid 26 of FIG. 9 correspond to the GMII, PCS, and hybrid of FIG. 2 and are considered to be separate from the transceiver. The combination of the transceiver 20 and hybrid 26 forms one "channel" of the communications system. Accordingly, FIG. 9 illustrates four channels, each of which operate in a similar manner. Features of the communications system of FIG. 9 are disclosed in the following copending patent applications, each of which is assigned of record to the assignee of record of this application Ser. No. 09/037,328, filed Mar. 9, 1998, entitled APPARATUS FOR, AND METHOD OF, REDUCING NOISE IN A COMMUNICATIONS SYSTEM, inventor Oscar E. Agazzi; Ser. No. 09/078,466, filed May 14, 1998, entitled STARTUP PROTOCOL FOR HIGH THROUGHPUT COMMUNICATIONS SYSTEMS, inventors Oscar E. Agazzi and John L. Creigh; and Ser. No. 09/078,933, filed May 14, 1998, entitled STARTUP PROTOCOL FOR HIGH THROUGHPUT COMMUNICATIONS SYSTEMS, inventor Oscar E. Agazzi.

The transmitter portion of each transceiver 20 includes a pulse shaping filter 32 and a digital to analog (D/A) converter 34. In a preferred embodiment of the invention the D/A converter 34 operates at 125 MHz. The pulse shaping filter 32 receives one one-dimensional (1-D) symbol from the PCS. This symbol is referred to as a TXDatax symbol 36, where x is 1 through 4 corresponding to each of the four channels. The TXDatax symbol 36 represents 2 bits of data. The PCS generates one 1-D symbol for each of the channels. The symbol for each channel goes through a spectrum shaping filter of the form $0.75+0.25\ z^{-1}$ at the pulse shaping filter 32 to limit emissions within FCC requirements. This simple filter shapes the spectrum at the output of the transmitter so that its power spectral density falls under that of communications systems operating at 100 Mb/second on two pairs of category −5 twisted pair wires. The symbol is then converted into an analog signal by the D/A converter 34 which also acts as a lowpass filter. The analog signal gains access to the unshielded twisted pair wire 18 through the hybrid circuitry 26.

The receiver portion of each transceiver includes an A/D converter 42, a FIFO 44, a digital adaptive equalizer system, a timing recovery circuit and noise reduction circuitry. The digital adaptive equalizer system includes a feed-forward equalizer (FFE) 46, two devices 50, 56, a skew adjuster 54 and two detectors 58, 60. The functions of these components, as related to the present invention, are explained below. The general concept of the use of a digital adaptive equalizer in a communications system is disclosed in U.S. Pat. No. 5,604,741 to Samueli et al. entitled ETHERNET SYSTEM. The noise reduction circuitry includes a NEXT cancellation system 38, an echo canceller 40, and a FEXT cancellation system 70.

The A/D converter 42 provides digital conversions of the signals received from the hybrid 26 at a suitable frequency, such as 125 MHz, which is equal to the baud rate of the signals. The A/D converter 42 samples the analog signals in accordance with an analog sample clock signal 78 provided by the decision-directed timing recovery circuit 64. The FIFO 44 receives the digital conversion signals from the A/D converter 42 and stores them on a first-in-first-out basis. The FIFO forwards individual signals to the FFE 46 in accordance with a digital sample clock signal 80 provided by the timing recovery circuit 64. The feed forward equalizer (FFE) 46 receives digital signals from the FIFO and filters these signals. The FFE 46 is a least mean squares (LMS) type adaptive filter which performs channel equalization and precursor inter symbol interference (ISI) cancellation to correct for distortions in the signal.

It should be noted that the signal introduced into the A/D converter 42 and subsequently into the FIFO 44 and FFE 46 has several components. These components include the direct signal received directly from the transmitter 22 at the opposite end of the unshielded twisted pair wire 18 with which the receiver 24 is associated. Also included are one or more of the NEXT, echo, and FEXT impairment signals from other transmitters 22 as previously described. The signal including the direct signal and one or more of the impairment signals is referred to as a "combination signal."

The FFE 46 forwards the combination signal 48 to a second device 50, typically a summing device. At the second device 50 the combination signal 48 is combined with the outputs of the NEXT cancellation system 38 and echo canceller 40 to produce a signal which is substantially devoid of NEXT and echo impairment signals. This signal is referred to as a "first soft decision" 52. The skew adjuster 54 receives the first soft decision 52 from the second device 50 and outputs a signal referred to as a "second soft decision" 66. The skew adjuster 54 performs two functions. First, it compensates for the difference in length of the unshielded twisted pairs 18 by delaying the first soft decision 52 so that the second soft decisions 66 from all of the receivers in the system are in sync. Second, it adjusts the delay of the first soft decision 52 so that the second soft decision 66 arrives at the first device 56 at substantially the same time as the output of the FEXT cancellation system 70. The skew adjuster 54 receives skew control signals 82 from the PCS 30.

The skew adjuster 54 forwards the second soft decision 66 to a first device 56, typically a summing device. At the first device 56 the second soft decision 66 is combined with the output of the FEXT cancellation system 70 to produce a signal which is substantially devoid of FEXT impairment signals. This signal is referred to as a "third soft decision" 68. The first detector 58 receives the third soft decision 68 from the first device 56. The first detector 58 provides an output signal, i.e., a "final decision" 72. The detector may be a slicer which produces a final decision 72 corresponding to the analog signal level closest in magnitude to the level of the third soft decision 68. The detector may also be either a symbol-by-symbol detector or a sequential detector which operates on sequences of signals across all four channels simultaneously, such as a Viterbi decoder.

Figure 10:
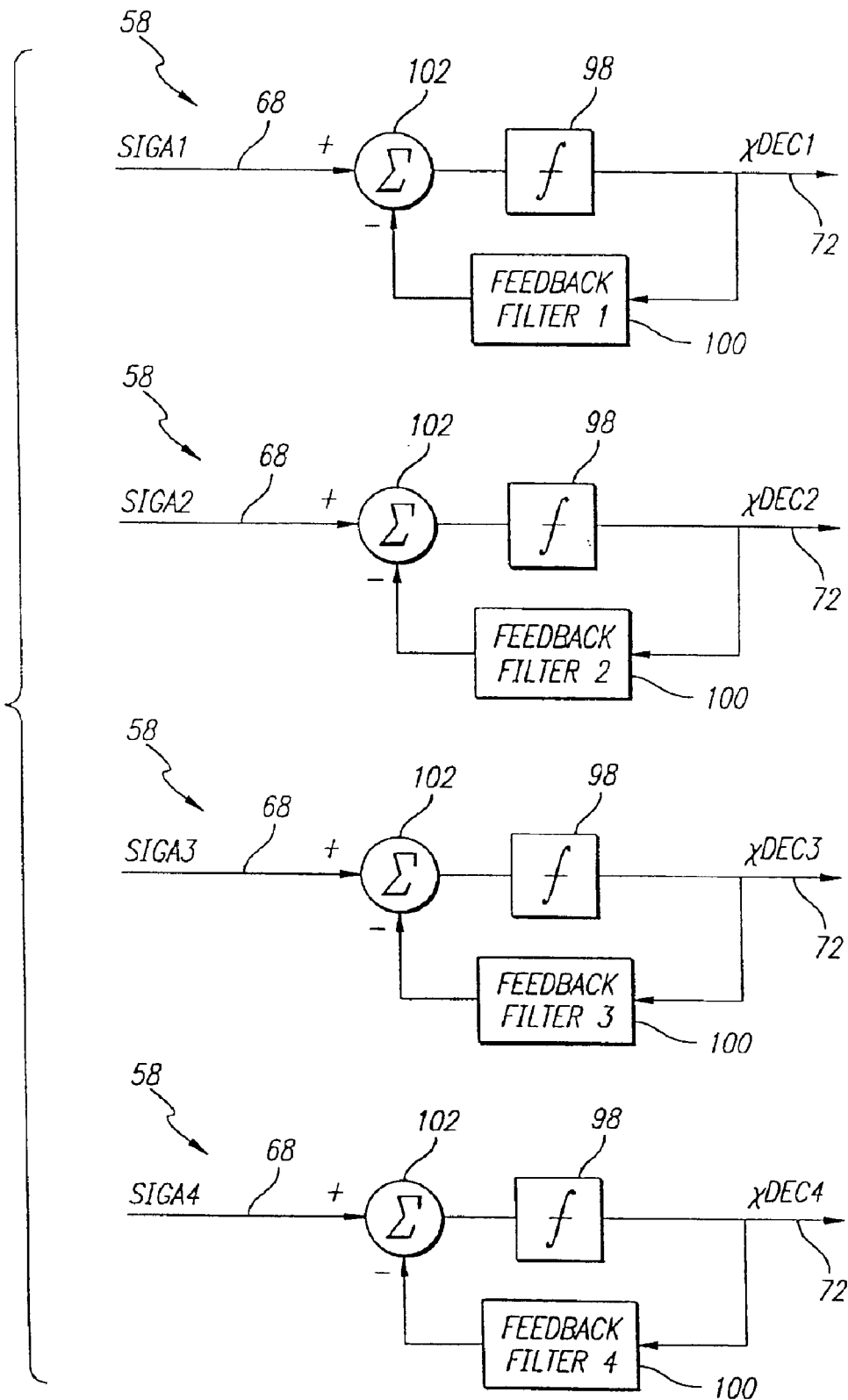
FIG. 10 is a schematic block diagram of a symbol-by-symbol detector of FIG. 9, each including a plurality of slicers, feedback filters and adders and receiving as input a soft decision.

In one embodiment the first detector 58 is a symbol-by-symbol detector. A group of symbol-by-symbol detectors 58, one for each channel, is shown in FIG. 10. Each first detector 58 includes a slicer 98, adaptive feedback filter 100 and an adder 102. The adder 102 combines the third soft decision 68 with the output of the adaptive feedback filter 100 to provide an output which is introduced to the slicer 98. The output of the slicer 98 in introduced to the adaptive feedback filter 100. The first detector 58 provides an output signal 72 which corresponds to the discrete level from the set [−2, −1, 0, 1, 2] which is closest to the difference between the third soft decision 68 and the output of the feedback filter 100. The adaptive feedback filter 100 corrects for distortion in the third soft decision 68. This filter 100 uses past slicer 98 decisions to estimate postcursor ISI caused by the channel. This ISI is canceled from the third soft decision 68 to form the final decision signal 72.

In another embodiment the first detector 58 is a combination of a sequential decoder with a decision feedback equalizer (DFE) using the architecture usually known as multiple DFE architecture (MDFE) sequential detector. The sequential decoder 58 looks at all signals from all four channels at the same time and at successive samples from each channel over several periods of unit time. A sequential decoder receives as input at least one signal from each of the first devices 56. The sequential decoder 58, in general, is responsive to the sequences of the output signals from the first devices 56 for (1) passing acceptable sequences of such signals and (2) discarding unacceptable sequences of such signals in accordance with the constraints established by the code standard associated with the system. Acceptable sequences are those which obey the code constraints and unacceptable sequences are those which violate the code constraints.

The second detector 60 (FIG. 9) receives the first soft decision 52 from the second device 50. The second detector 60 is a symbol-by-symbol detector. It provides an output signal 74 which corresponds to the discrete level from the set [−2, −1, 0, 1, 2] which is closest to the difference between the first soft decision 52 and the output of the feedback filter 100. The second detector 60 produces output signals 74 without the benefit of FEXT cancellation, as a result, these decisions have a higher error rate than those made by the first detector 58, which enjoys the benefits of FEXT cancellation. Because of this fact, these decisions are called "tentative decisions". It is important to note that the postcursor ISI present in the input to the second detector 60 is canceled using the adaptive feedback filter 100, (FIG. 10) contained within the second detector, whose inputs are the tentative decisions 74. The coefficients of this adaptive feedback filter 100 are the same as those of the adaptive feedback filter associated with the first detector 58 (FIG. 9).

A third device 62, typically a summing device, receives the first soft decision signal 52 from the second device 50 and the tentative decision signals 74 from the second detector 60. At the third device 62 the first soft decision 52 is combined with the tentative decision signal 74 to produce an error signal 76 which is introduced into the timing recovery circuit 64. The timing recovery circuit 64 receives the tentative decision 74 from the second detector 60 and the error signals 76 from the third device 62. Using these signals as inputs the timing recovery circuit 64 outputs an analog clock sync signal 78 which is introduced to the A/D converter 42 and a digital clock sync signal 80 which is introduced into the FIFO 44. As previously mentioned, these signals control the rate at which the A/D converter 42 samples the analog input it receives from the hybrid 26 and the rate at which the FIFO forwards digital signals to the FFE 46. A suitable timing recovery device for use in the present invention is disclosed in copending patent application Ser. No. 08/970,557, filed Nov. 14, 1997, entitled APPARATUS FOR, AND METHOD OF, PROCESSING SIGNALS TRANSMITTED OVER A LOCAL AREA NETWORK, inventors Henry Samueli, Fung Lu and Avanindra Madisetti and assigned of record to the assignee of record of this application.

Figure 11:
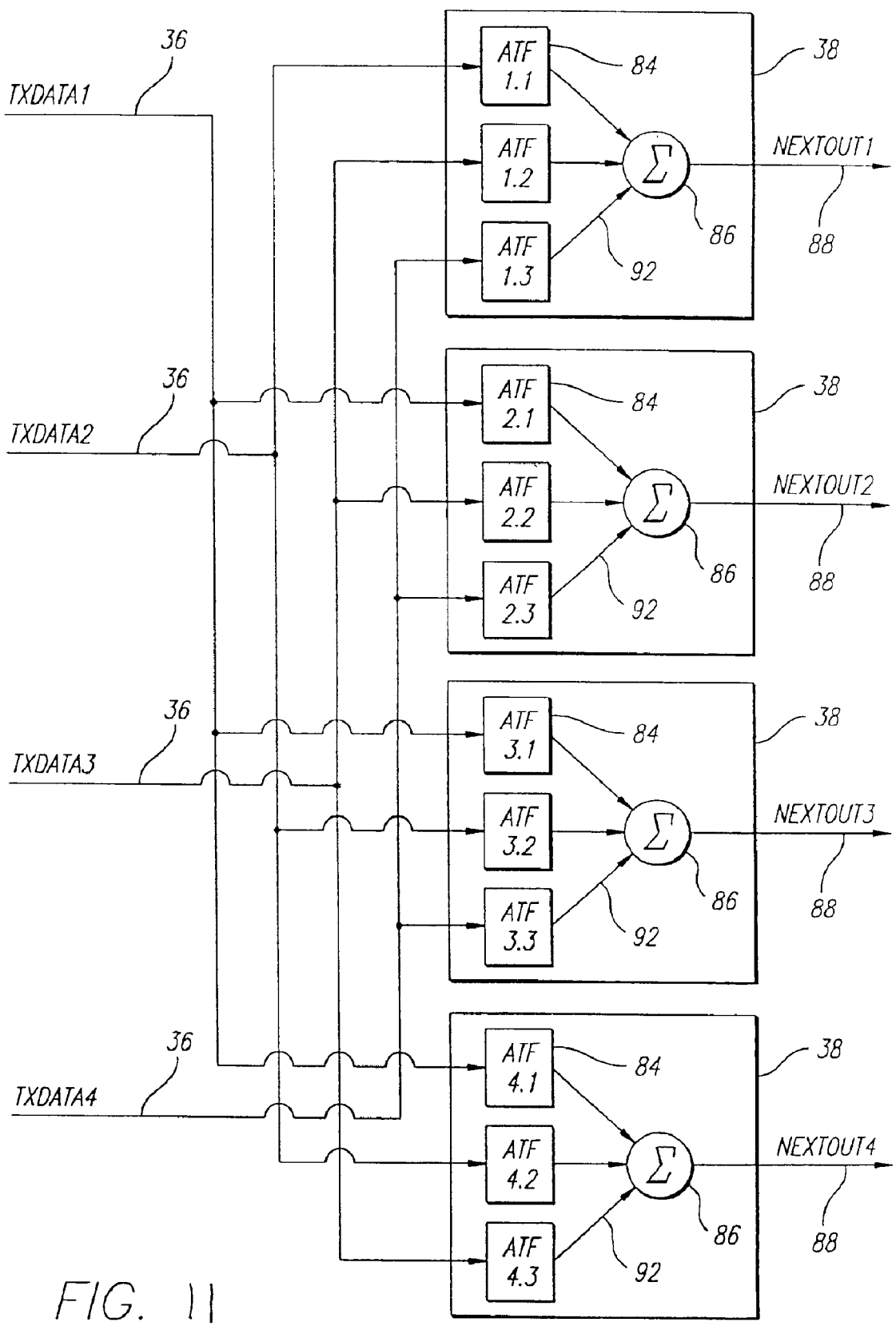
FIG. 11 is a schematic block diagram of the NEXT cancellation systems of FIG. 9, each including a plurality of adaptive transversal filters (ATF) and adders and receiving as input transmitted signals from adjacent transmitters.

As mentioned before, the symbols sent by the transmitters 22 (FIG. 2) in the communications system cause NEXT, echo and FEXT impairments in the received signal for each channel. Since each receiver 24 has access to the data for the other three channels that cause this interference, it is possible to nearly cancel each of these effects. NEXT cancellation is accomplished using three adaptive NEXT cancelling filters as shown in the block diagram of FIG. 11. Each NEXT cancellation system 38 receives three TXDatax symbols 36 from each of the transmitters at the same end of the communications line 18 as the receiver with which the NEXT cancellation system is associated. Each NEXT cancellation system 38 includes three filters 84, one for each of the TXDatax symbols 36. These filters 84 model the impulse responses of the NEXT noise from the transmitters and may be implemented as adaptive transversal filters (ATF) employing, for example, the LMS algorithm. The filters 84 produce a replica of the NEXT impairment signal for each TXDatax symbol 36. A summing device 86 combines the three individual replica NEXT impairment signals 92 to produce a replica of the NEXT impairment signal contained within the combination signal received by the receiver with which the NEXT cancellation system 38 is associated. The replica NEXT impairment signal 88 is introduced into the second device 50 (FIG. 9) where it is combined with the combination signal 48 to produce a first soft decision signal 52 which is substantially devoid of NEXT impairment signals.

Figure 12:
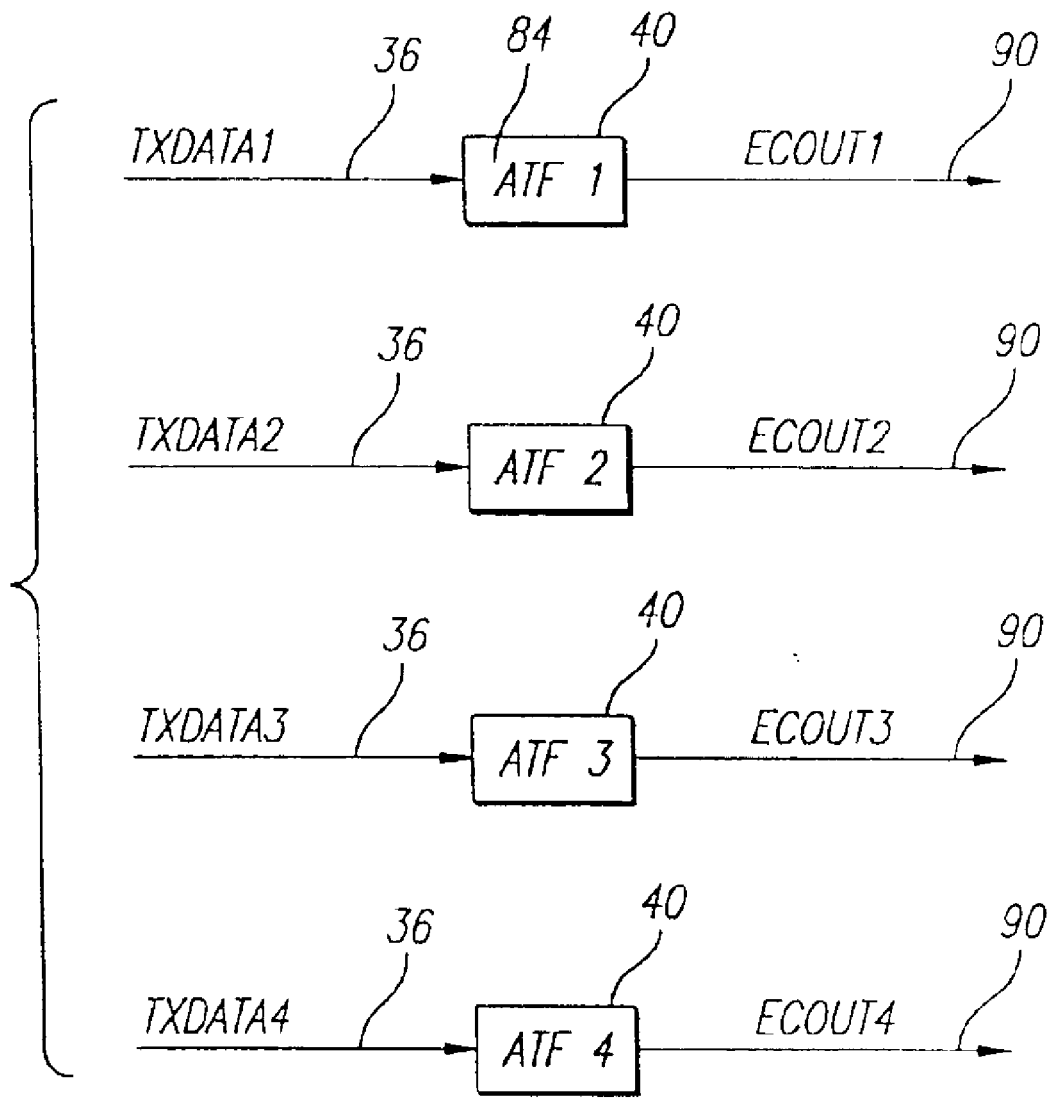
FIG. 12 is a schematic block diagram of the echo cancellers of FIG. 9, each including an ATF and receiving as input transmitted signals from same transmitters.

Echo cancellation is accomplished with an adaptive cancelling filter 85 as shown in the block diagram of FIG. 12. Each echo canceller 40 receives the TXDatax symbols 36 from the transmitter at the same end of the twisted wire pair 18 as that of the receiver with which the echo canceller is associated. As shown in FIG. 9, each echo canceller 40 includes one filter 85. These filters 85 model the impulse responses of the echo noise from the transmitter and may be implemented as ATFs employing, for example, the LMS algorithm. The filter produces a replica of the echo impairment signal contained within the combination signal received by the receiver with which the echo canceller 40 is associated. The replica echo impairment signal 90 is introduced into the second device 50 (FIG. 9) where it is combined with the combination signal 48 to produce the first soft decision signal 52 which is substantially devoid of echo impairment signals.

Figure 13:
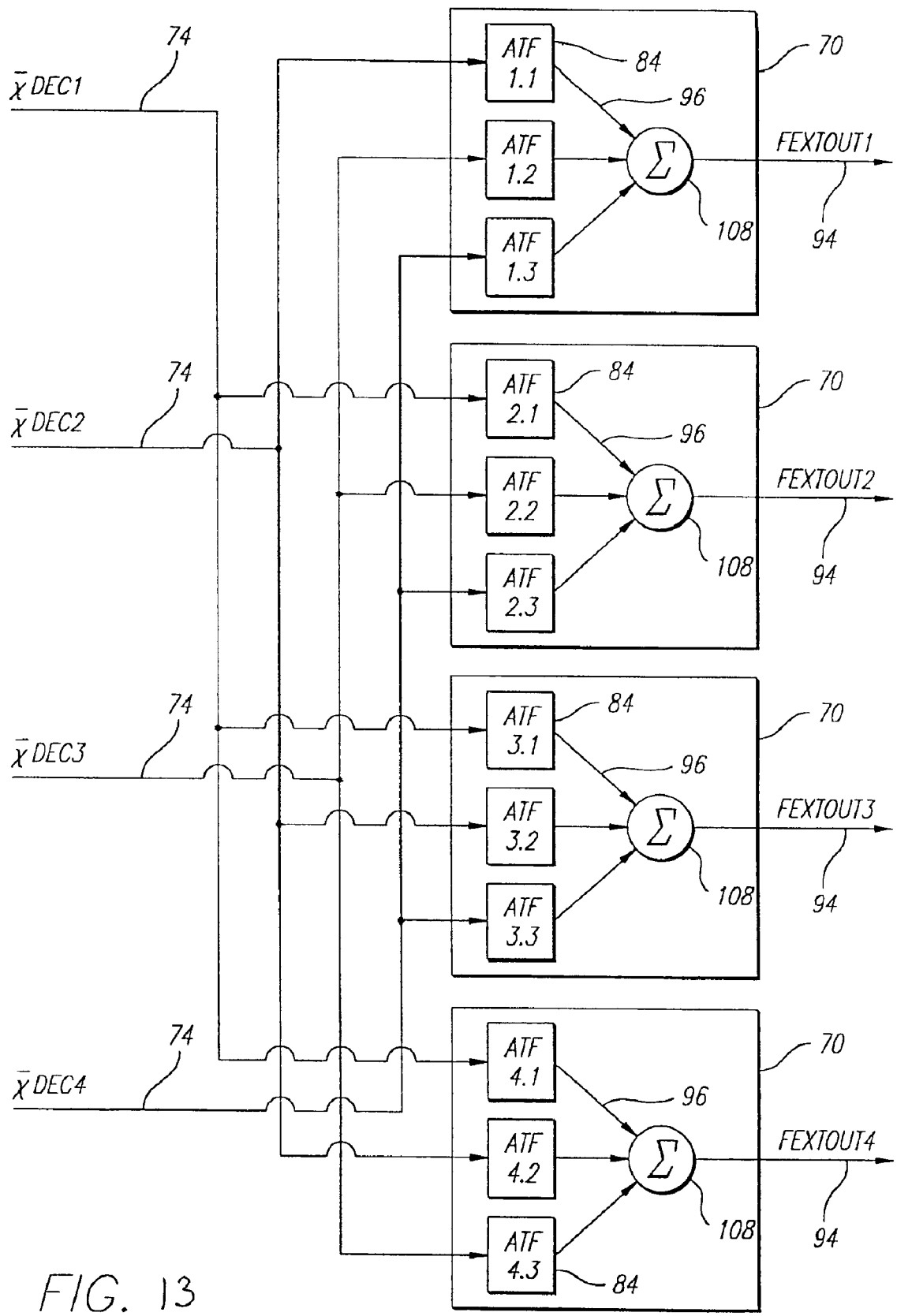
FIG. 13 is a schematic block diagram of the FEXT cancellation systems of FIG. 9, each including a plurality of ATFs and an adder and receiving as input transmitted signals from opposite transmitters.

FEXT cancellation is accomplished with three adaptive FEXT cancelling filters 87 as shown in the block diagram of FIG. 13. Each FEXT cancellation system 70 receives three tentative decision symbols 74 one from each of the receivers at the same end of the communications line as the receiver with which the FEXT cancellation system is associated. Each FEXT cancellation system 70 includes three filters 87, one for each of the tentative decision symbols 74. These filters 87 model the impulse responses of the FEXT noise from transmitters and may be implemented as ATFs employing, for example, the LMS algorithm. The filters 87 produce a replica of the FEXT impairment signal 96 for each individual tentative decision symbol 74. A summing device 108 combines the three individual replica FEXT impairment signals 96 to produce a replica of the FEXT impairment signal contained within the combination signal 48 received by the receiver with which the FEXT cancellation system is associated. The replica FEXT impairment signal 94 is introduced into the first device 56 (FIG. 9) where it is combined with the second combination signal 66 to produce the third soft decision signal 68 which is substantially devoid of FEXT impairment signals. It is important to note that the higher error rate of the tentative decisions 74 does not degrade the performance of the FEXT cancellation system 70, because the decisions used to cancel FEXT are statistically independent from the final decisions 72 made by the receiver whose FEXT is being canceled. Details of a FEXT cancellation system are disclosed in copending patent application Ser. No. 09/037,328, filed Mar.9,1998, entitled APPARATUS FOR, AND METHOD OF, REDUCING NOISE IN A COMMUNICATIONS SYSTEM, inventor Oscar E. Agazzi and assigned of record to the assignee of record of this application.

The symbols provided by the first detector 58 are decoded and descrambled by the receive section of the PCS 30 before being introduced to the GMII. Variations in the way the wire pairs are twisted may cause delays through the four channels by up to 50 nanoseconds. As a result, the symbols across the four channels may be out of sync. As previously mentioned, in the case where the first detector is a sequential detector, the PCS also determines the relative skew of the four streams of 1-D symbols and adjusts the symbol delay, through the skew adjuster 54, prior to their arrival at the first detector 58 so that sequential decoder can operate on properly composed four-dimensional (4-D) symbols. Additionally, since the cabling plant may introduce wire swaps within a pair and pair swaps among the four unshielded twisted pairs, the PCS 30 also determines and corrects for these conditions.

Figure 14:
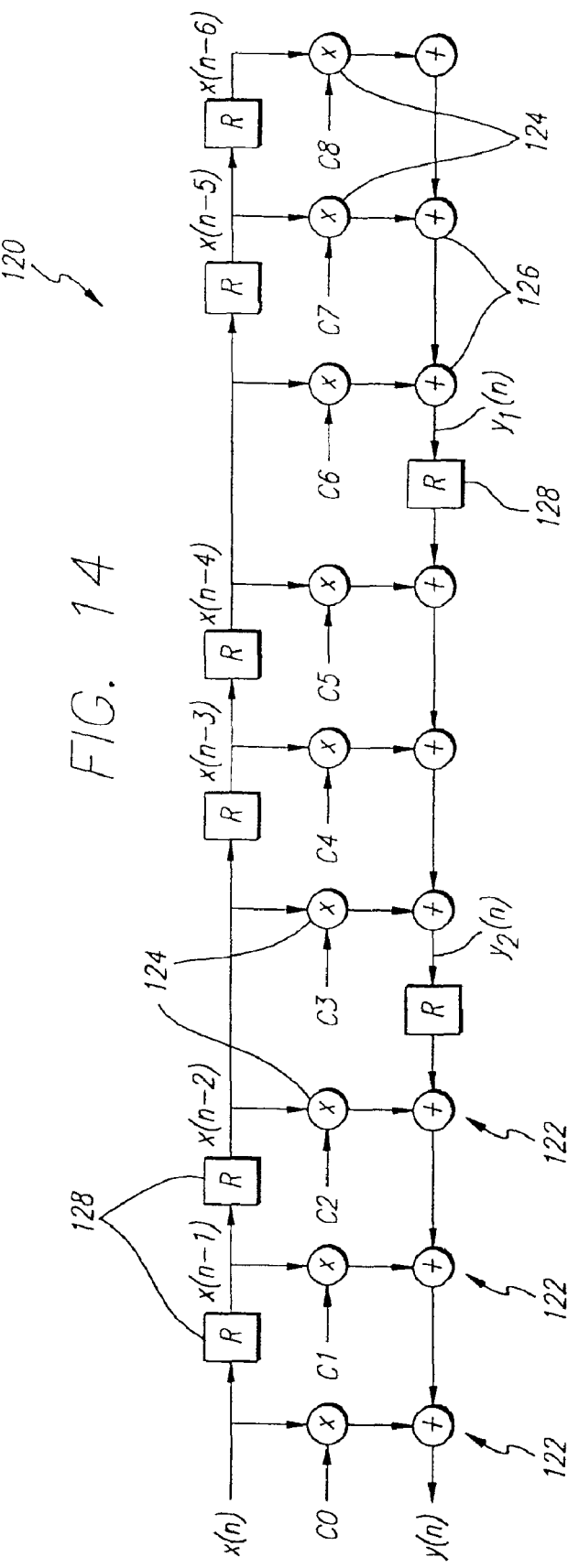
FIG. 14 is a schematic diagram of an ATF, including a cascade of taps, present in the NEXT cancellation system of FIG. 11, the echo cancellers of FIG. 12, and the FEXT cancellation system of FIG. 13.

As previously mentioned, the NEXT cancellation system, echo canceller and FEXT cancellation system use ATFs to effectively cancel the noise from the combination signal. An example of an ATF which may be employed by the present invention is shown in FIG. 14 and is further disclosed in copending patent application Ser. No. 60/107,877, filed Nov. 9, 1998 entitled DIRECT-TRANSPOSED FILTER, inventor Mehdi Hatamian and assigned of record to the assignee of record of this application. The ATF 120 includes a plurality of taps 122 each including a multiplier 124 and an adder 126. Associated with each tap 122 is a coefficient Cn, where n is 0 through x−1 where x is the number of taps in the ATE. The circuitry associated with each tap 122 includes a 1-bit storage (not shown) that allows for activation and deactivation of the tap. The values of the coefficients Cn are adjusted in accordance with an LMS algorithm as mentioned before. Interposed between the taps 122 are registers 128. These registers 128 provide data to the taps 122 at timed intervals in accordance with a clock signal. A suitable register 128 for use in the present invention is disclosed in copending patent application Ser. No. 60/107,878, filed Nov. 9, 1998, entitled STATIC-DYNAMIC REGISTER, inventor Mehdi Hatamian and assigned of record to the assignee of record of this application.

Figure 7:
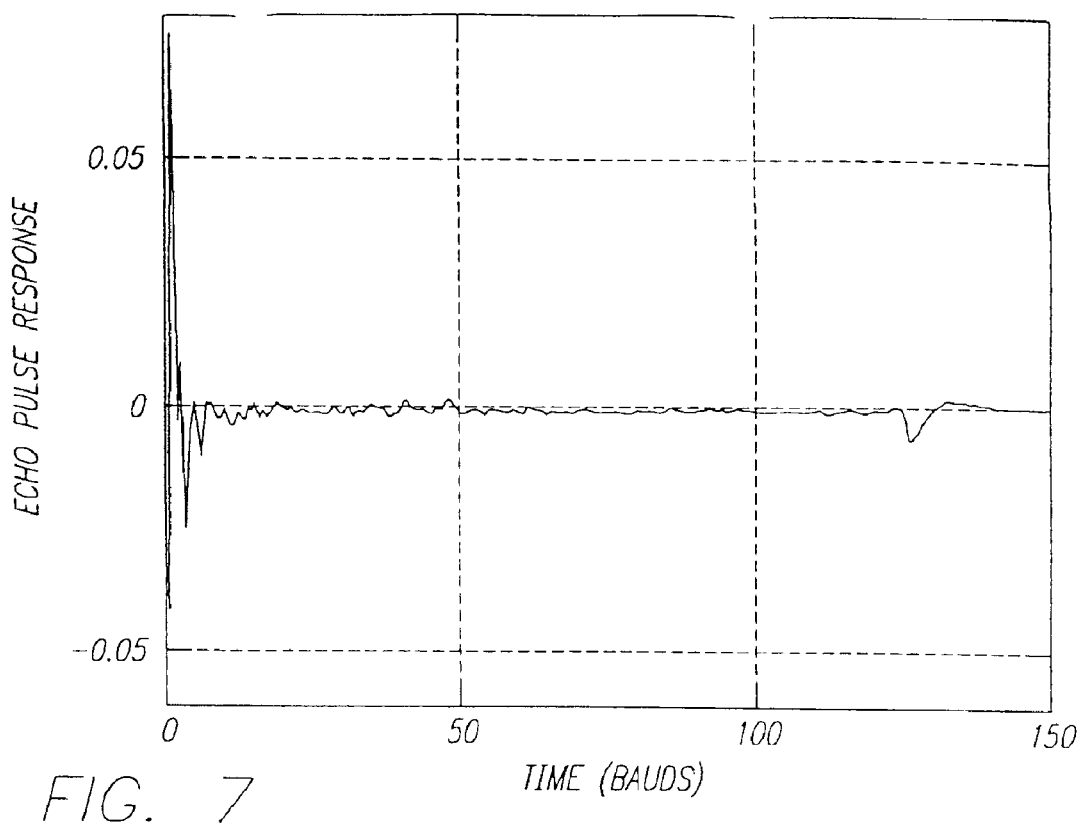
FIG. 7 depicts an impulse response for an echo signal passing through a 100 m communications line.
Figure 8:
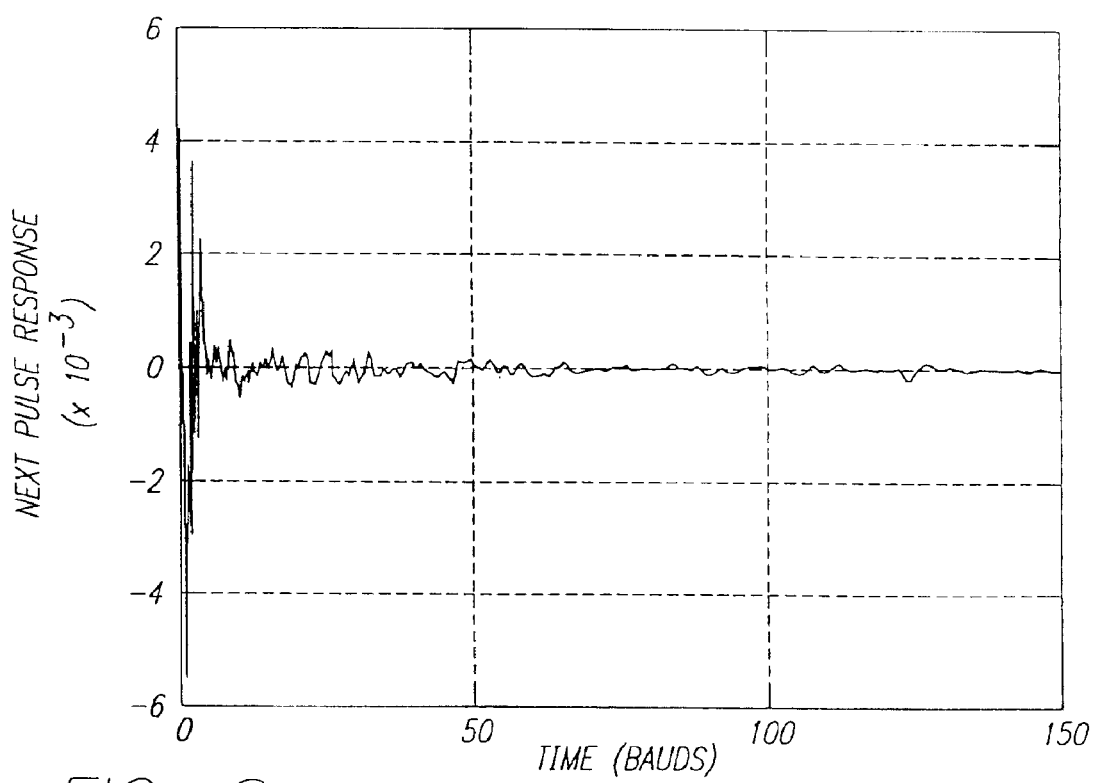
FIG. 8 depicts an impulse response for an NEXT signal passing through a 100 m communications line.

The impulse responses of an echo and NEXT, as shown in FIGS. 7 and 8, indicates that not all taps 122 in the NEXT and echo cancellers 38, 40 are contributing significantly to the performance of the communications system. The present invention determines what taps 122 are not contributing significantly to the reduction of the mean squared error (MSE) of the system and deactivates these taps, thereby eliminating them from the filtering computation and thus reducing considerably the power dissipation of the system. Furthermore, as shown by the impulse response of FIGS. 7 and 8, the need to build NEXT and echo cancellers 38, 40 with a long span is difficult to avoid. Specific cable responses may differ from the one depicted in FIGS. 7 and 8, and accordingly require more or fewer taps 122 than that required for the cable of FIGS. 7 and 8. As mentioned before it is difficult to determine a priori what taps 122 are needed with a particular cable.

In accordance with the present invention, the NEXT, echo, and FEXT cancellers 38, 40, 70 are configured with ATFs 120 which employ a sufficient number of taps 122 to provide adequate cancellation with the worst-case expected impulse responses. This may require 140 taps 122 as in the example of FIG. 7, or even more for longer cables. To reduce the power dissipation, the taps 122 are examined after convergence, and those taps that are found not to contribute significantly to the performance of the system are deactivated. When the tap 122 is deactivated, it is removed from the NEXT, echo and FEXT replica computation and from the adaptation and its contribution to the overall power dissipation of the system is substantially eliminated.

Figure 15:
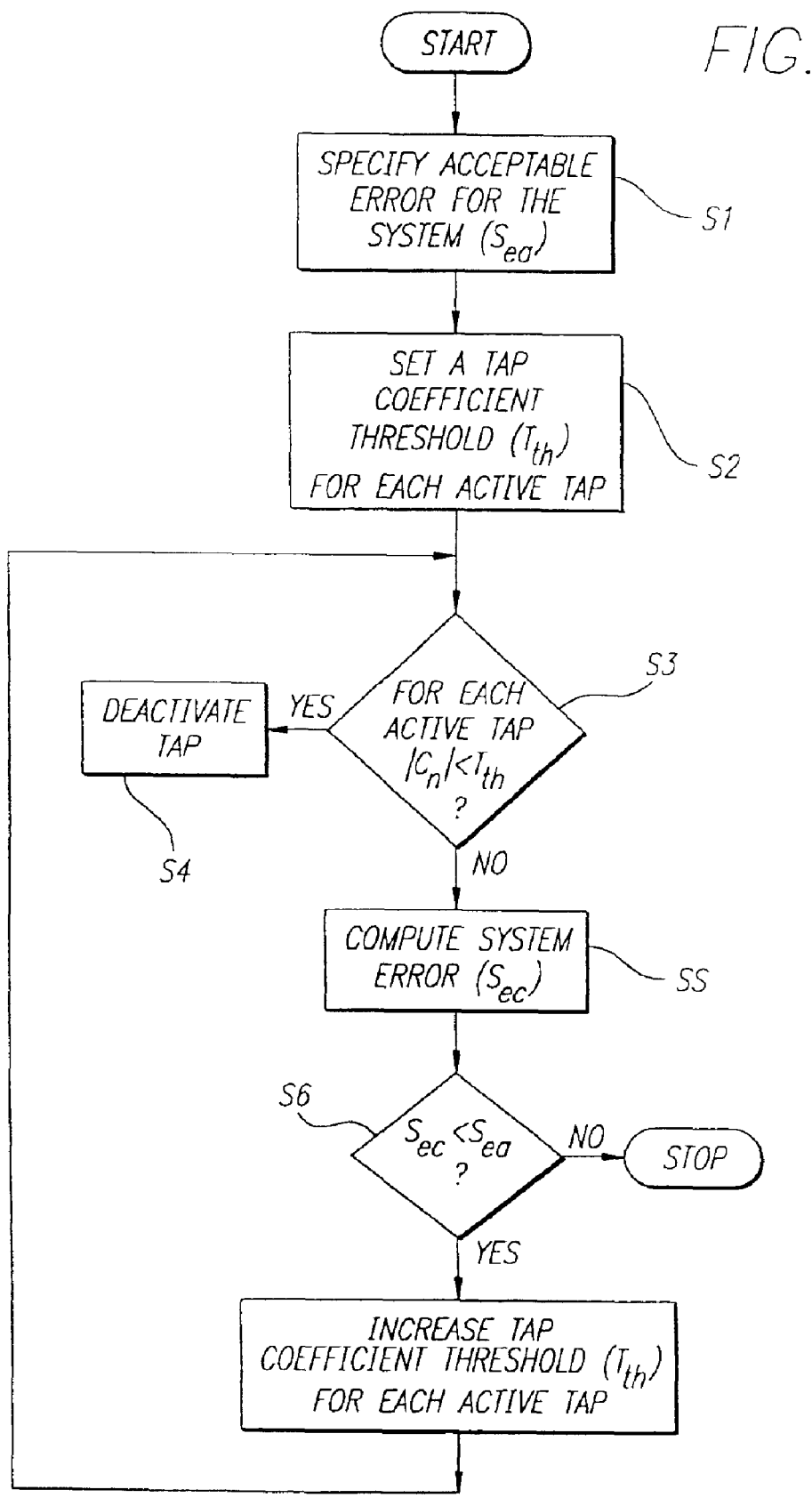
FIG. 15 is a flow chart illustrating one embodiment of the power dissipation reduction method of the present invention.

When the system is initially converged, all taps 122 are active, so the NEXT, echo and FEXT cancellers 38, 40, 70 are converged along their entire length. After convergence, the taps 122 are examined to determine which ones can be deactivated using the tap scanning algorithm depicted in FIG. 15. At step S1, an acceptable level of error for the system $S_{ea}$ is specified. At step S2, a tap coefficient threshold $T_{th}$ is set for each active tap. While each individual tap may have a unique tap threshold $T_{th}$, in a preferred embodiment of the invention the tap thresholds for all taps are substantially the same. The initial value of the tap coefficient threshold $T_{th}$ is sufficiently low such that only a few taps 122 are deactivated and the performance of the system is not significantly affected. In a preferred embodiment of the invention, the tap coefficient threshold $T_{th}$ is initially set equal to the tap coefficient $C_n$ having the minimum absolute value. Alternatively, a reasonable value can be determined by simulation. This initial value is not critical, as long as it is sufficiently low to avoid a large degradation of the performance of the system the first time the tap scanning procedure is applied.

At step S3, the absolute value of the tap coefficient $C_n$ for each active tap is compared to the tap coefficient threshold $T_{th}$. If the tap coefficient $C_n$ is less than the tap coefficient threshold $T_{th}$ the tap 122 is deactivated at step S4. This process is repeated for each tap 122 in the filter 120. Preferably, the determination of whether to deactivate a tap 122 is done in a sequential manner starting at the input end of the filter 120. At step S5, the error for the system $S_{ec}$ is computed. This error is computed by first computing the MSE for each active tap 122 by multiplying the absolute value of the tap coefficient $C_n$ by the average energy signal. The error of the filter 120 associated with the tap 122 is determined by summing the individual tap errors. The error of the system is then determined by summing the individual filter errors.

In step S6, the computed system error $S_{ec}$ is compared to the specified acceptable system error $S_{ea}$. If the computed system error $S_{ec}$ is less than the acceptable system error $S_{ea}$, the tap threshold $T_{th}$ for each active tap is increased by a small amount at step S7 and steps S3 through S6 are repeated. As a result, some additional taps 122 are deactivated, but the number of taps deactivated is usually not very large because of the small increase in the tap threshold $T_{th}$. Steps S3 through S6 are repeated until the computed system error $S_{ec}$ approaches the acceptable system error $S_{ea}$ without exceeding the acceptable system error. If the computed system error $S_{ec}$ is greater than the acceptable system error $S_{ea}$, the tap scanning algorithm stops.

As an alternative to determining whether to deactivate a tap based on the MSE of the communications system, a determination may be made based on the MSE of an individual filter. In this embodiment of the invention an acceptable level of error for a filter $F_{ea}$ is specified. Individual taps are deactivated, as previously described, and a computed filter error $F_{ec}$ is calculated. If the deactivation of a tap does not cause the computed filter error $F_{ec}$ to exceed the acceptable filter error $F_{ea}$ the tap remains inactive.

In yet another embodiment, the contribution of each deactivated tap to the MSE of the filter and, in turn, the system is calculated. If the MSE contribution of the tap is determined to be an acceptable amount the tap remains deactivated. This method is generally preferred during the initial startup of the system when the overall MSE of the system is large due to the nonconverged state of the filter coefficients within the system. Once the filter coefficients of the system have initially converged, the determination of whether to deactivate a tap is generally made based on the taps contribution to the MSE of the system as previously described with reference to FIG. 15.

Figure 16:
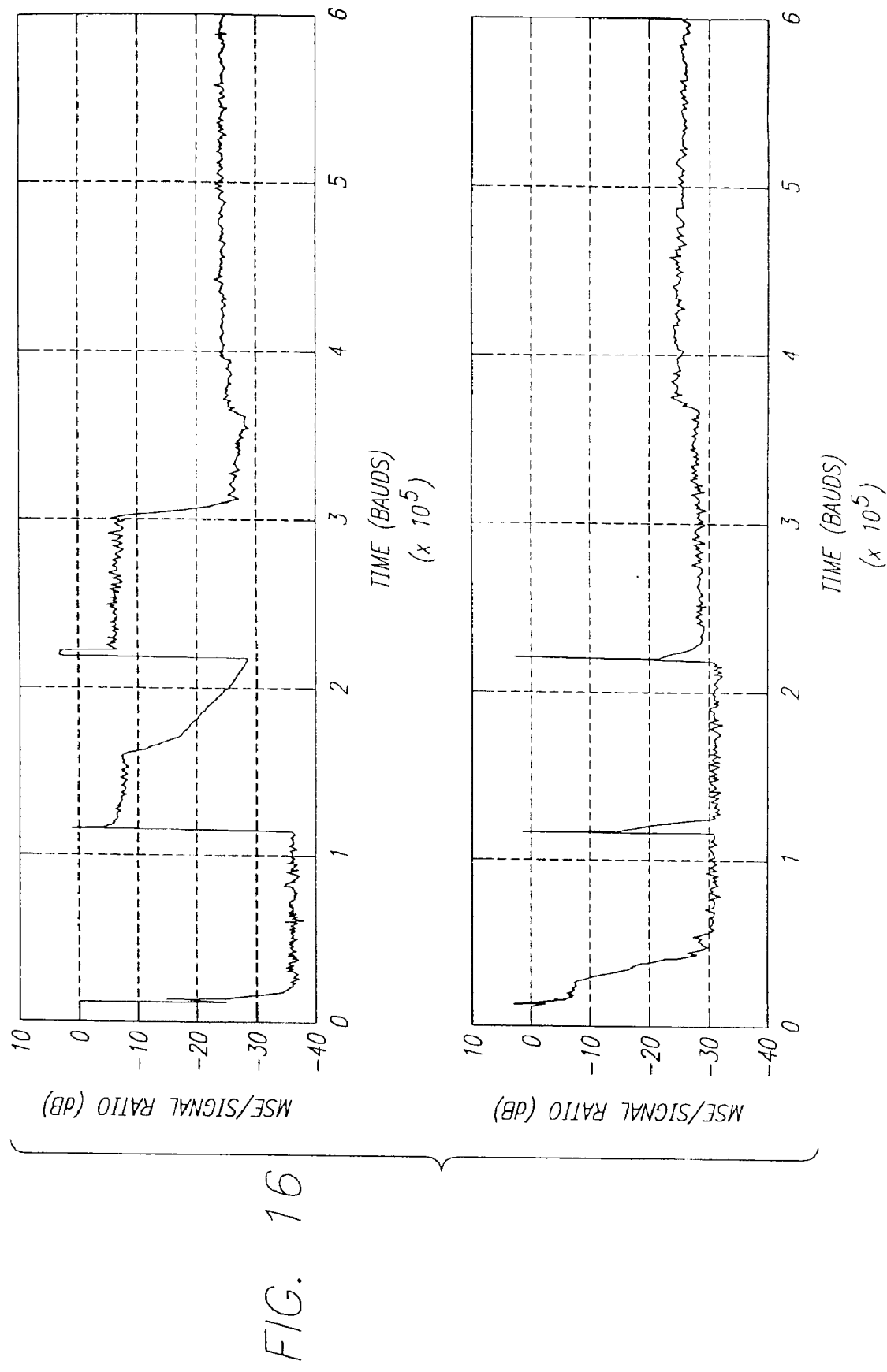
FIG. 16 depicts the mean squared error (MSE) to signal ratio as a function of time during the initial convergence of a communications system.
Figure 17:
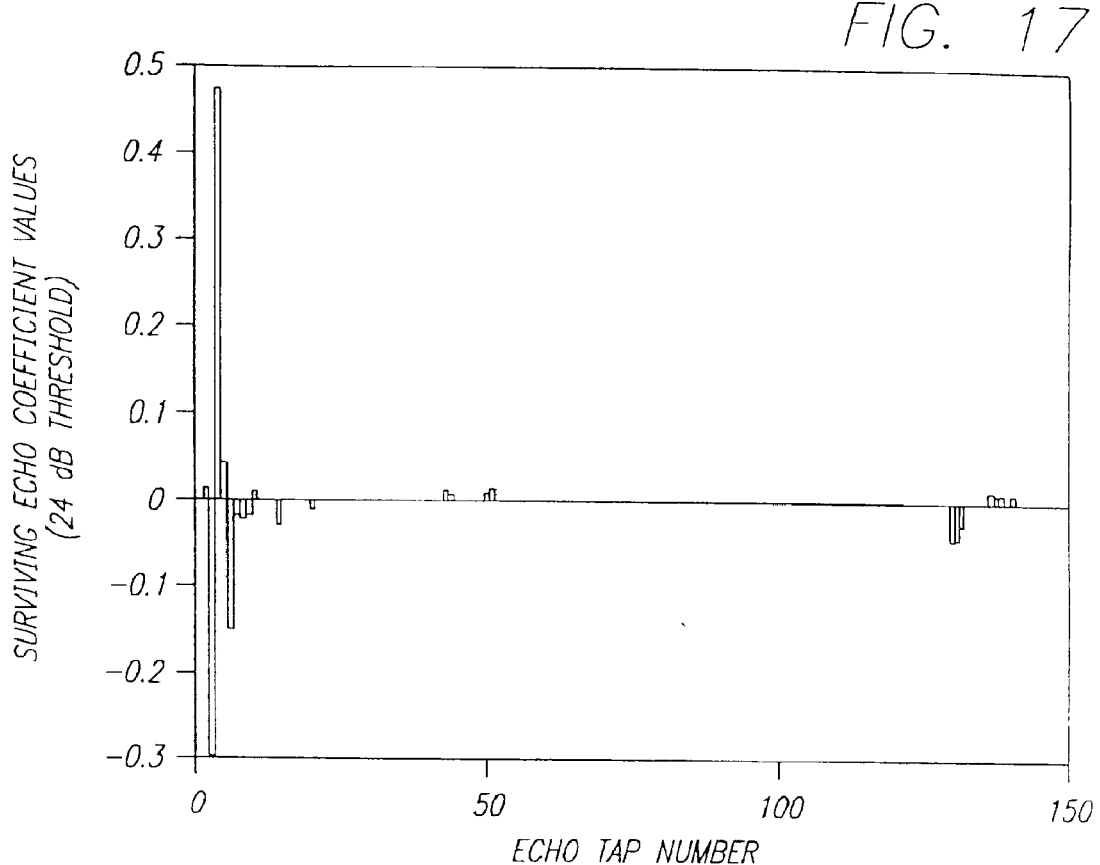
FIG. 17 depicts the taps of an echo canceller which remain active after convergence of a communications system having error threshold of 24 dB.
Figure 18:
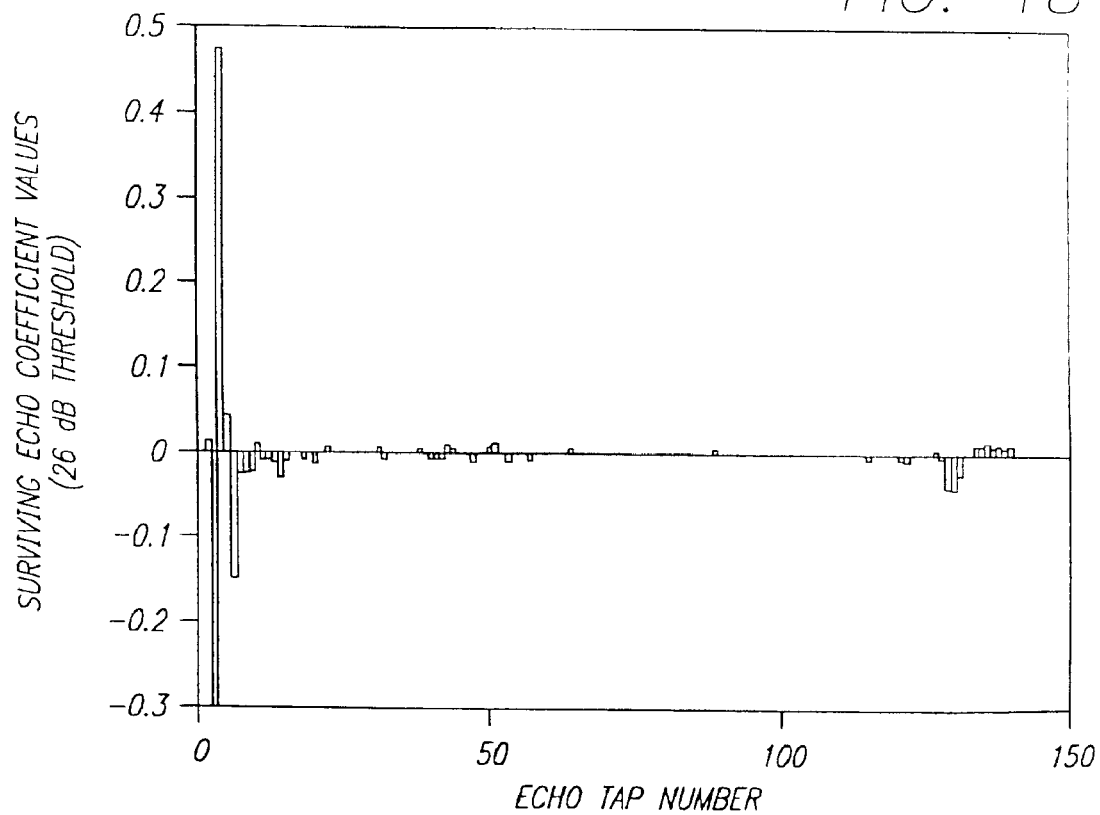
FIG. 18 depicts the taps of an echo canceller which remain active after convergence of a communications system having error threshold of 26 dB.

The final result of the tap scanning algorithm is that, in typical channels of the communication system, a large number of taps 122 is deactivated, and power dissipation is reduced by a large factor. As an example, computer simulations of the tap scanning algorithm when operating on the channel whose echo response is shown in FIG. 7 are presented in FIG. 16. This figure shows both the master and slave MSE to signal ratios as a function of time during the initial convergence of the system. At time t=360,000 bauds, the tap scanning algorithm begins, and as a result the MSE to signal ratio increases to the prespecified target of 24 dB. FIG. 17 shows the taps of the echo canceller after convergence with a threshold of 24 dB and FIG. 18 shows the taps with a threshold of 26 dB. The deactivated taps are shown as zeros. In FIG. 17, the total number of active taps for the echo canceller is twenty-two. Similarly, the number of active taps 122 for the three NEXT cancellers (not shown) forming the NEXT cancellation system is six, two, and zero, respectively. In FIG. 18, the total number of active taps for the echo canceller is forty-seven. Similarly, the number of active taps 122 for the three NEXT cancellers (not shown) is six, two, and zero, respectively.

For the case of the 24 dB threshold, out of 440 initially active taps, only 30 remain active after the application of the tap scanning algorithm, while maintaining a 5 dB margin for required bit error rate. Notice from FIGS. 17 and 18 that those taps 122 which remain active occur at sparse locations, and it would have been difficult to statically allocate these taps during the design of the NEXT and echo cancellers, because the location of taps is highly dependent on the specific cable response.

Figure 19:
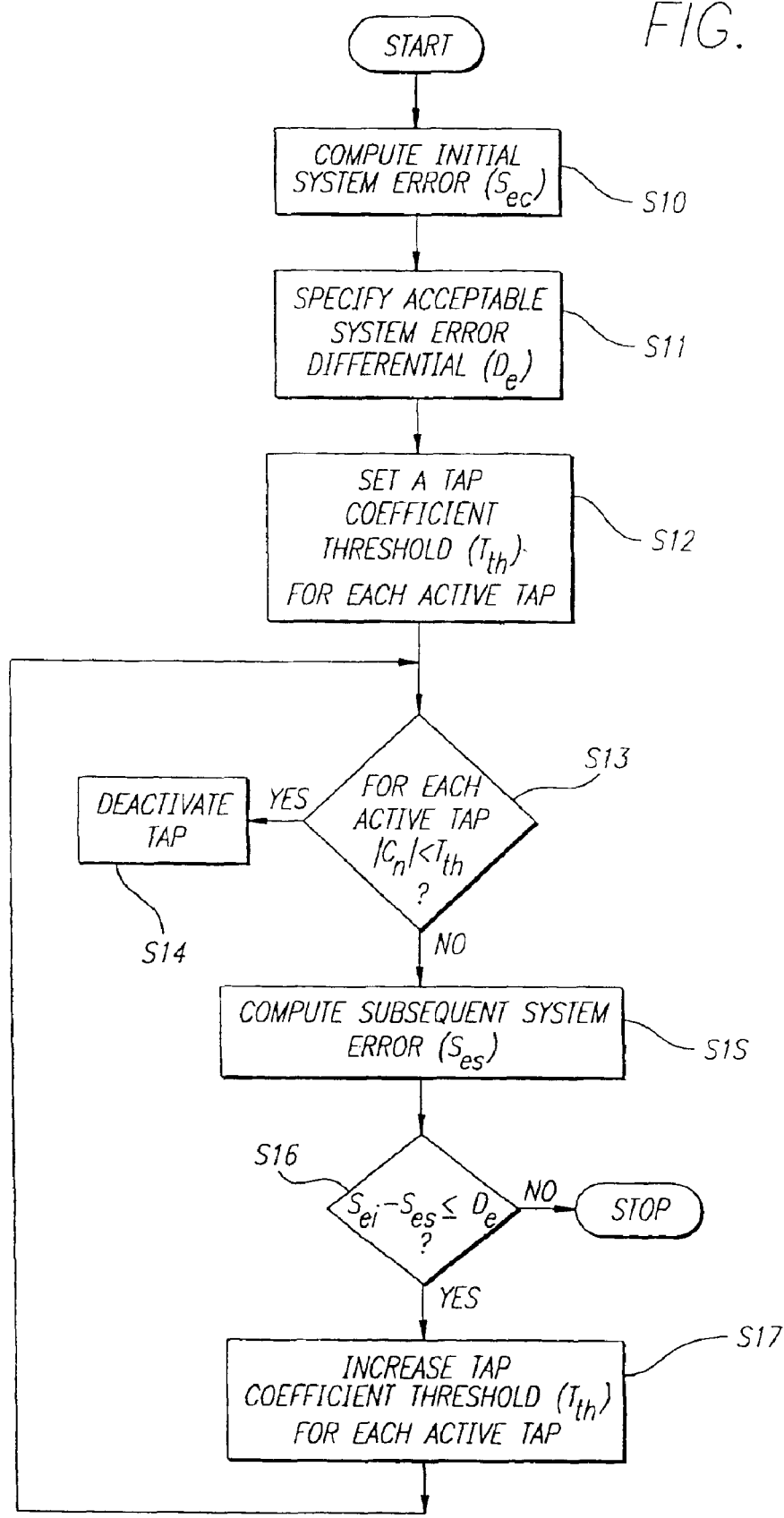
FIG. 19 is a flow chart illustrating another embodiment of the power dissipation reduction method of the present invention.

In another embodiment of the invention, the tap scanning algorithm monitors the change in MSE as the tap scanning algorithm progresses. The algorithm is applied until the change in MSE—rather than the MSE itself—exceeds a prespecified value, for example 1 dB. If the MSE to signal ratio before the scanning is applied is 25 dB, the final MSE to signal ratio is 24 dB, and a large number of taps is deactivated. This embodiment of the tap scanning algorithm is depicted in FIG. 19. In step S10, the initial system error is $S_{ei}$ computed. In step S11, an acceptable system error differential $D_e$ is specified. In step S12, a tap coefficient threshold $T_{th}$ is set for each active tap. As with the other tap scanning algorithm, the initial value of the tap threshold $T_{th}$ is sufficiently low such that only a few taps 122 are deactivated and the performance of the system is not significantly affected.

At step S13, the absolute value of the tap coefficient $C_n$, for each active tap is compared to the tap coefficient threshold $T_{th}$. If the tap coefficient $C_n$ is less than the tap coefficient threshold $T_{th}$ the tap 122 is deactivated at step S14. This process is repeated for each tap 122 in the filter 120. Preferably, the determination of whether to deactivate a tap 122 is done in a sequential manner starting at the input end of the filter 120. At step S15, the subsequent error for the system $S_{es}$ is computed.

In step S16, the subsequent error for the system $S_{es}$ is compared to the to the initial system error is $S_{ei}$. If the difference between the subsequent system error $S_{es}$ and the initial system error $S_{ei}$ is less than a prespecified value, the tap threshold $T_{th}$ is increased by a small amount at step S17 and steps S13 through S16 are repeated. As a result, some additional taps 122 are deactivated. Steps S13 through S16 are repeated until the difference between the subsequent system error $S_{es}$ and the initial system error $S_{ei}$ exceeds the prespecified value.

In some cases the impulse responses of NEXT, echo and FEXT may change during normal operation, for example as a result of temperature changes. It is therefore desirable to periodically activate previously deactivated taps 122, preferably in a sequential manner, and recheck if the absolute value of the tap coefficient $C_n$ is below the tap threshold $T_{th}$. If a tap coefficient $C_n$ has grown to a value above the tap threshold $T_{th}$, the tap 122 remains active, otherwise it is deactivated. Similarly, those taps 122 that were active may fall below the tap threshold $T_{th}$, in which case they are deactivated. All this can be accomplished with a periodic reapplication of the sequential tap scanning algorithm during normal operation.

In an alternate embodiment of the invention a select number of taps 122, for example ten, positioned at the input end of the filter 120 are not subject to deactivation. Usually there is a large slew rate in these first few taps 122, which means that their numerical value could change significantly if the sampling phase changes. This sampling phase could change dynamically as a result of jitter, causing some previously deactivated taps 122 to become significant. By maintaining a number of taps 122 at the input end of the filter in an active state, potential degradations in the presence of jitter are avoided.

When the total number of taps is very large, for example 440, the power dissipation could be large during the initial convergence transient before the tap scanning algorithm has had a chance to deactivate the taps. Although the average power dissipation of the system is still greatly reduced, the peak power is not. A preferred embodiment of the invention compensates for this by converging the NEXT, echo and FEXT cancellers in stages. For example, a block of 20 taps is converged at a time, and the tap scanning algorithm is then applied to these taps on a per-block basis. In cases where the MSE during the initial convergence is large, for example as a result of the fact that the initial block of 20 taps may not be large enough to provide a lower MSE, it may be better to monitor the sum of the squared values of the coefficients of deactivated taps 122 as a measure of whether the algorithm can be terminated.

Although this invention has been disclosed and illustrated with reference to particular embodiments, the principles involved are susceptible for use in numerous other embodiments which will be apparent to persons of ordinary skill in the art. The invention is, therefore, to be limited only as indicated by the scope of the appended claims.

What is claimed is:

1. A method of reducing power dissipation in a communications system having at least one adaptive filter having at least one tap, said method comprising:

setting at least one tap threshold; and dynamically adjusting the at least one tap threshold to allow at least one tap to be activated or deactivated to converge an error to a prespecified acceptable target error;

wherein dynamically adjusting the at least one tap threshold comprises determining whether to deactivate a tap based upon an adjusted tap threshold;

wherein determining whether to deactivate a tap comprises:

determining a filter error; and if the filter error is less than a prespecified acceptable filter target error, deactivating the tap.

2. A method of reducing power dissipation in a communications system having at least one adaptive filter having at least one tap, said method comprising:

setting at least one tan threshold; and dynamically adjusting the at least one tan threshold to allow at least one tap to be activated or deactivated to converge an error to a prespecified acceptable target error;

wherein the at least one adaptive filter has a sufficient number of taps to accommodate for delay due to a length of the communications line;

said method further comprising partitioning the taps into a plurality of blocks each having at least one tap and wherein activation and deactivation of adaptive filters is preformed on a block-by-block basis, wherein the blocks are adjusted in a sequential manner starting at an input end of at least one adaptive filter.

* * * * *

UNITED STATES PATENT AND TRADEMARK OFFICE
CERTIFICATE OF CORRECTION

PATENT NO. : 6,898,238 B2 Page 1 of 1
APPLICATION NO. : 09/930584
DATED : May 24, 2005
INVENTOR(S) : Oscar E. Agazzi, John L. Creigh and Mehdi Hatamian It is certified that error appears in the above-identified patent and that said Letters Patent is hereby corrected as shown below:

Column 16, line 15, change "tan" to "tap".

Column 16, line 16, change "tan" to "tap".

Column 16, line 28, change "preformed" to "performed".

Signed and Sealed this

Twenty-fourth Day of February, 2009

JOHN DOLL
*Acting Director of the United States Patent and Trademark Office*